US012705353B2

(12) United States Patent
Camp et al.

(10) Patent No.: US 12,705,353 B2
(45) Date of Patent: Aug. 11, 2026

(54) ANTI-MALWARE BEHAVIORAL GRAPH ENGINES, SYSTEMS AND METHODS

(71) Applicant: ARTIC WOLF NETWORKS, INC., Eden Prairie, MN (US)

(72) Inventors: Tracy E. Camp, Beaverton, OR (US); Svetoslav Vassilev, Portland, OR (US)

(73) Assignee: Arctic Wolf Networks, Inc., Eden Prairie, MN (US)

( * ) Notice: Subject to any disclaimer, the term of this patent is extended or adjusted under 35 U.S.C. 154(b) by 199 days.

(21) Appl. No.: 18/366,886

(22) Filed: Aug. 8, 2023

(65) Prior Publication Data

US 2024/0061937 A1 Feb. 22, 2024

Related U.S. Application Data

(60) Provisional application No. 63/491,789, filed on Mar. 23, 2023, provisional application No. 63/371,551, filed on Aug. 16, 2022.

(51) Int. Cl.
*G06F 21/56* (2013.01)
*G06F 40/237* (2020.01)

(52) U.S. Cl.
CPC .......... *G06F 21/566* (2013.01); *G06F 40/237* (2020.01)

(58) Field of Classification Search
CPC ............................ G06F 21/566; G06F 40/237
See application file for complete search history.

(56) References Cited

U.S. PATENT DOCUMENTS

2015/0205956 A1* 7/2015 Sakurai ................ G06F 21/552 726/23
2017/0075904 A1* 3/2017 Hedges ................ G06F 16/367
2018/0212986 A1* 7/2018 Shen ........................ H04B 1/38
2019/0020667 A1* 1/2019 Parker .................. H04L 63/107
2020/0125727 A1* 4/2020 Wu ...................... G06F 40/289
2020/0349430 A1* 11/2020 Schmidtler ............. G06N 5/02
2021/0064751 A1* 3/2021 Li ....................... G06F 18/2413
2021/0258479 A1 8/2021 Ekstrand et al.
2021/0281583 A1* 9/2021 Okunlola ........... H04L 63/1416
2021/0357507 A1* 11/2021 Sulatycki ............... G06F 9/541
2021/0400059 A1* 12/2021 Hong .................... G06N 3/096

(Continued)

FOREIGN PATENT DOCUMENTS

JP 2019-049800 A 3/2019
KR 102046789 B1 11/2019

(Continued)

OTHER PUBLICATIONS

International Search Report and Written Opinion of PCT Patent Application No. PCT/US2023/071885 mailed Nov. 24, 2023, 10 pages.

Bengio et al., A Neural Probabilistic Language Model 2003, Journal of Machine Learning Research 3 (2003), available from https://www.jmlr.org/papers/volume3/bengio03a/bengio03a.pdf.

(Continued)

*Primary Examiner* — Meng Li

(74) *Attorney, Agent, or Firm* — Barnes & Thornburg LLP

(57) ABSTRACT

The methods and systems are operable to protect a computing environment from attack. The methods and systems incorporate a preventative ability with similar attributes to an Antivirus/Anti-malware technique suitable for use on home user or similar protected computing environments with no or minimal centralized human administrative resources using natural language.

16 Claims, 18 Drawing Sheets

(56) References Cited

U.S. PATENT DOCUMENTS

| | | | | |
|---|---|---|---|---|
| 2022/0050895 | A1* | 2/2022 | Yu | G06F 21/55 |
| 2022/0067160 | A1* | 3/2022 | Mammadli | G06F 16/21 |
| 2022/0129551 | A1* | 4/2022 | Collier | G06F 21/565 |
| 2022/0150268 | A1 | 5/2022 | Herwono et al. | |
| 2022/0237303 | A1 | 7/2022 | Inokuchi et al. | |
| 2024/0061937 | A1* | 2/2024 | Camp | G06F 21/566 |

FOREIGN PATENT DOCUMENTS

| | | | | |
|---|---|---|---|---|
| WO | WO2021059471 | A1 | 1/2021 | |
| WO | WO-2021258479 | A1 * | 12/2021 | G06N 3/045 |
| WO | 2024039984 | A1 | 2/2024 | |

OTHER PUBLICATIONS

Hassan, et al., Tactical Provenance Analysis for Endpoint Detection and Response Systems, The Internet, available from https://adambates.org/publications/ (May 18, 2020).
Vaswani et al., Attention Is All You Need, The Internet, available from https://arxiv.org/abs/1706.03762 (Jun. 12, 2017).
Wei, et al., DeepHunter: A Graph Neural Network Based Approach for Robust Cyber Threat Hunting, available from https://arxiv.org/abs/2104.09806 (Apr. 20, 2021).
Search Report in Australia Patent Application No. 2023324978, dated Apr. 15, 2026, 3 pages.
Search Report in Canada Patent Application No. 3263592, dated Feb. 4, 2026, 8 pages.
Search Report in Japan Patent Application No. 2025505733, dated Mar. 30, 2026, 2 pages.

* cited by examiner

```
rule label_MOTW:
{
  description:
    Label AW 1553.005 on files downloaded from the internet.

  reaction:
    Target.SetAttackWords(T1553.005)

  condition :
          (Op.Type == "FILE_CLOSE_MODIFIED") and
             (Target.FileZoneId >= 3)
}
rule label_DoubleExtension:
{
  description:
          Label AW T1036.007 - writing executable files with a double extension

  reaction:
    Target.SetAttackWords(T1036.007)

  condition:
    (Op.Type == "FILE_CREATE_NEW") &&
                ( Target.FileName == ["*.doc.???", "*.docx.???", "*.pdf.???", "*.xls.???", "*.xlsx.???", "*.sln.???",
"*.png.???", "*.gif.???", "*. jpg.???", "*.jpeg.???", "*.avi.???", "*.mov.???", "*.mp3.???", "*.ppt.???", "*.pptx.???",
"*.zip.???", "*.7z.???"] ) &&
                ( Target.FileExtension = [ "com", "exe", "bat", "cmd", "vbs", "vbe", "jse", "wsf", "wsh", "msc", "scr",
"ocx", "sys", "pyw", "ps1" ] )
}

rule label_CredTheft:
{
  description:
    Label AW T1555.003 - processes reading MS Teams credentials
```

```
reaction:
    Initiator.SetAttackWords("T1555.003")

  condition:
    (Op.Type == "FILE_OPEN_READ") &&
      (Initiator.Classification != "MSTeams") &&
              (Target.FilePath == [
                  "<UserProfiles>\\*\\AppData\\Roaming\\Microsoft\\Teams\\Cookies",
        "<UserProfiles>\\*\\AppData\\Roaming\\Microsoft\\Teams\\Local Storage\\leveldb\\*.log",
        "<UserProfiles>\\*\\AppData\\Roaming\\Microsoft\\Teams\\Local Storage\\leveldb\\*.ldb" ])
```

```
rule evict_attackers:
{
  description:
    Terminate processes that more than 3 AW and the last one was predicted > 25% probability

  reaction:
    Evict, Log, Notify

  condition:
    (Initiator.AttackWords.Count > 3) &&
        (Initiator.NextAttackWordProbability > 25)
}
```

```
rule causality_parent_to_child:
{
  description:
    Transfer state from parent to a newly created child proces

  reaction:
    Target.SetAttackWords(Initiator)

  condition:
    (Op.Type == "CREATE_PROCESS")
}
rule causality_file_to_process:
{
  description:
    Transfer state from parent to a newly created child proces

  reaction:
    Initiator.SetAttackWords(Target)

  condition:
    (Op.Type == ["LOAD_LIBRARY", "LOAD_SCRIPT"])
}
rule causality_process_to_file:
{
  description:
    Transfer state from a process to the newly written file

  reaction:
        Target.SetAttackWords(Initiator)

  condition:
    (Op.Type == "FILE_CLOSE_MODIFIED")
}
```

ANTI-MALWARE BEHAVIORAL GRAPH ENGINES, SYSTEMS AND METHODS

CROSS-REFERENCE

This application claims the benefit of U.S. Provisional Application No. 63/371,551, filed Aug. 16, 2022, entitled ANTI-MALWARE BEHAVIORAL GRAPH ENGINES, SYSTEMS AND METHODS and U.S. Provisional Application No. 63/491,789, filed Mar. 23, 2023, entitled ANTI-MALWARE BEHAVIORAL GRAPH ENGINES, SYSTEMS AND METHODS which applications are incorporated herein in its entirety by reference. which application is incorporated herein in its entirety by reference.

NOTICE OF COPYRIGHTS

A portion of the disclosure of this patent document contains material which is subject to copyright protection. The copyright owner has no objection to the facsimile reproduction of the patent disclosure as it appears in the Patent and Trademark Office patent files or records, but otherwise reserves all copyright rights whatsoever.

BACKGROUND

In the field of computer security unauthorized use of computing resources, unauthorized access of data or unauthorized modification of data is referred to as 'an attack'. The system(s) or networked communication paths between systems(s) that the authorized owner wishes to maintain authorization control over is referred to here as the 'protected computing environment'. The person, software or organization conducting 'the attack' against the 'protected computing environment' is referred to as 'the attacker'. The person, software or organization defending the protected computing environment from the attack and attacker is referred to as 'the defender'. A protected computing environment may have one or more authorized users, the defender may also be an authorized user, but may also be a separate entity from the set of authorized users. The attacker if they gain access to resources within the protected computing environment is an unauthorized user of those resources.

The defender has two basic approaches to protecting the computing environment from the attack and the attacker. The first basic approach to protecting a computing environment focuses on detecting and preventing 'malicious' compiled or scripted programs from execution or mitigating the impacts of their execution through additional security controls that might be applied in real time or after the fact. Techniques to detecting such malicious applications have included:

- Creating a baseline of authorized applications or network communication and only allowing explicitly authorized programs to be executed (often called 'application control' or by the anachronistic term 'whitelisting') or network communications to occurs (often called 'firewalling');
- Performing analysis of compiled or scripted programs to attempt to pre-determine the effects of their execution before the fact (often called Antivirus or Anti-malware scanning);
- Computing a similarity between a compiled or scripted program to known malicious programs (typically an alternative technique deployed by 'Antivirus/Anti-malware" scanning);

- Allowing a suspect program to execute in a disposable computing environment to observe its behavior prior to allowing executing in a protected computing environment (often called 'Detonation' or 'Sandboxing' or sometimes a 'Next Generation Firewall') This may be combined with other analysis techniques;
- Hashing or other fingerprinting techniques to compare against lists of known malicious applications (typically an alternative technique deployed by 'Antivirus/Anti-malware' but also by 'Reputation services' or 'Reputation Feeds'); and
- Creating rule sets or artifacts (such as filenames, domain names, IP addresses, process names) that if a program violates or interacts with will deem it to be malicious (often called 'Host Intrusion Detection' or 'Network Intrusion Detection').

Antivirus/Anti-malware techniques in particular are simple to administer and are often deployed on protected computing environments comprising a computer used for personal use in somebody's home. Other techniques such as application control, Host Intrusion Prevention System (HIPS)/Network Intrusion Protection System (NIPS) and Detonation often work best in larger protected computing environments with some degree of centralized human administration. These techniques collectively are most effective if an attacker of a protected computing environment uses a single or small number of compiled or scripted programs to conduct their attack and repeats the same procedures across a wide number of attack victims. If the attacker varies behavior, or uses authorized programs in unexpected ways to conduct an attack (which can defeat the application control technique), existing techniques often fail to detect or prevent the attack. An example of using an authorized program in an unexpected way could occur, for example, if there is an authorized utility program that is highly configurable either by a config file or command line parameters and has the ability to download updates from the internet and invoke an updater utility in order to update an authorized application; an attacker could manipulate the command line parameters to download a malicious script and invoke a command interpreter with the downloaded script. The authorized utility is providing its function, but its purpose has been subverted from the original author's intent of updating an application to being used to invoke a malicious script. A specific weakness to this approach is if an attacker attempts an attack but is rebuffed by techniques, the attacker can change their behavior using this knowledge of what mitigation techniques are in place and attack again until they find a combination that is not prevented.

Another approach focuses on monitoring and auditing the behavior of a protected computing environment. This approach does not count on preventing malicious programs from running, but allows an operator or automated system to look for patterns of behavior that indicate unauthorized use of the protected computing environment. This approach is reactive, but has a powerful detection advantage over a purely preventative approach in that it focuses on the actual net behavior of programs and network communications in the protected computing environment without prior knowledge if a specific program is malicious or not, or more significantly if an attacker of the protected computing environment is using authorized programs in unexpected ways to achieve the goals of their attack. In particular it can be used to watch for repeated attacks if initial attacks are rebuffed, prioritize closing gaps in a preventative defense (such as applying software updates, or changing firewall rules). This monitoring approach is often called 'Enterprise Detection and Response' (EDR) if it is focused on computing resources, 'Network Detection and Response' (NDR) if it is focused on networking resources, or 'eXended Detection and Response' (XDR) if it is a hybrid of both computing and networking resource monitoring. Implementations collect data about the activity of computing and network resources, may use manual or automated searches or query processes to find patterns of attack (often called 'threat hunting'). Such systems, while they may incorporate various automated tools to assist in this process, are most suited to larger protected computing environments such as those common in large business organizations with some degree of centralized human administration.

A defender might use aspects of both basic approaches to defend a protected computing environment (often called 'Next Generation Anti-virus'). However the approach is most effective in larger computing environments with centralized human administration due to its operating cost and complexity.

What is needed are methods and systems for protecting a computing environment from attack that incorporates an administratively simple preventative ability with the breadth of detection capabilities of the monitoring and auditing approach. Additionally what is needed are systems and mechanisms for determining that two events are causally related and systems and mechanisms for observing cause and effect relationships between entities in a computing system.

SUMMARY

The disclosed systems for operating anti-malware behavioral graph engine comprise a memory and a processor in operable communication with the memory, wherein the processor is operable to provide instructions and data and perform the disclosed steps. Computer-readable storage medium are also configurable and operable in conjunction with data and programmed instructions to, upon execution by a processor, perform a method to the disclosed steps. Additionally, the methods disclosed operate in a computer network and are operable to perform the programmed operations.

Disclosed are methods and systems for protecting a computing environment from attack that has many of the detection advantages of a monitoring and auditing approach, but incorporates a preventative ability with similar attributes to an Antivirus/Anti-malware technique suitable for use on home user or similar protected computing environments with no or minimal centralized human administrative resources.

Also disclosed are systems and mechanisms for determining that two or more events are causally related and systems and mechanisms for observing cause and effect relationships between entities in a computing system.

Disclosed malware models are operable to detect attacks that can be complex attacks and involve multiple stages (e.g., multi-stage attacks) to achieve tactical attack goals using a variety of techniques as an abstract 'attack language'. The use of a conceptual model of an attack builds on existing work compiled by the MITRE Corporations descriptive ATT&CK(™) matrix framework, which while a useful reference is not exhaustive or complete. The attack language approach can work with other descriptive frameworks, or across multiple such descriptive frameworks. In the abstract attack language model, a specific technique that an attacker uses to conduct an attack is added as a member of the languages lexicon. The attack language is semantically structured such that semantically complete sentences to describe the activities that an attack would need to take in order to achieve tactical attack goals or strategic attack goals. Such a complete sentence could in principle be used as input into a high level scripting environment to repeat an attack upon the same or a different computing environment. From semantically complete attack sentences a grammar of attack language can be derived that constitutes a body of rules that indicate if a given sequence of two or more attack words (AW) represents a grammatically correct attack sentence. Grammatically correct attack sentences represent attacker actions that an attacker could take that would further their goals as far as obtaining unauthorized use of the protected computing environment.

The disclosed approach monitors one or more events from a protected computing environment and classifies the one or more events that represent specific members of the attack language lexicon. It is expected that most events in a computing environment do not represent members of the attack language lexicon and such events are excluded from further consideration. By way of analogy, in noisy environment where somebody is speaking there may be many sounds, only some of which are parts of human speech, a listener that desires to hear a conversation must filter out the sounds that are not parts of human speech, similarly classifying events as members of the attack language lexicon is a first step at understanding an attack. There are various methods of picking out events that represent members of the attack language lexicon and many of these methods are key to prior HIPS, EDR, NDR and XDR solutions, some however are better suited to a real time evaluation of events.

The disclosed approach automates discovering the abstract attack language grammatical relationships between members of the lexicon. The approach builds a conceptual graph representing an attack language sentence. Nodes are added to this graph using information derived from a model of causal relationships within a given operating system or network. By using a causal relationship model there is increased confidence that two words in the attack language lexicon are related to each other in a causal manner. By way of analogy the causal relationship model is similar to picking out words spoken by an individual speaker in a crowded room with many people speaking, if we simply detected words being spoken throughout the room, it would be improbable that we would arrive at a coherent sentence. At which point it is possible to apply derived grammatical rules around the attack language to determine if a grammatically correct sentence is being formed. If it is not, the newly detected attack word does not represent behavior of an attacker and it can be ignored.

Using the graph representation of an attack sentence it is possible to build a model to predict the next attack words, portions of the attack sentence being formed, and/or next attack sentences. The method allows a threshold of confidence based on observed attack words to be defined that demonstrates a semantically complete attack language or sentence that would be formed. The information can be used to stop the attack.

The systems and methods are configurable and operable to stop the attack either by directly modifying the underlying event that has been labeled as representing the next attack word such as prevent an operation, modify the data or terminate a process. A graph representation can also be used to 'walk backwards' using the graph as a source of providence information due to the graph being populated using the causality model. Further remediation actions can then be taken based on previous events such as deleting or repairing malicious or infected files, removing configuration changes, scheduled tasks and services the attacker may have created, or even quarantining entire elements of the computing environment.

The disclosed systems and methods are also configurable and operable to obtain events from a variety of scopes within the overall protected computing environment, including from a device operating system, device local or cloud hosted social media application. As will be appreciated by those skilled in the art, cloud hosted social medial applications include any and all of the various ways that users interact with other users in a computing environment or the metaverse. The social media applications include, but are not limited to Facebook, LinkedIn, X (formerly Twitter), MS Teams, Slack, Discord, online games and other social interations including gmail, Google docs, github and the like. Using a classification engine or engine(s), the systems and methods determine if a given event or sequence of events from some event source represents a word in a defined lexicon of attack words. Additionally, events are maintained and classified as attack words in a directed graph data structure where links are created between graph nodes and actors according to domain specific causal relationship rules. Events that occur within a cloud hosted social media application are correlated to events that occur as a response on a protected device or another social media application. Natural language machine learning models are used to determine if provenance paths through the directed graph store of detected attack words represent semantically meaningful attack sentences. Taking a remediation action occurs upon detecting a semantically meaningful attack sentence. Natural language machine learning models can be used to determine if providence paths through the graph of detected attack words represent semantically meaningful attack sentence fragment(s) and predicting the next possible attack words to make the sentence complete. A scoped remediation action can be taken based on the predicted next attack words in an attack sentence. Using the overall topology of attack sentence graphs allows the system and methods to establish a general identity for both authorized user entities and attacker entities. Additionally, using the overall topology of attack sentence graphs to establish specific identities for individual user entities and attacker entities. Additionally, using the identity of a normal user and attacker entity to feedback into natural language model training as labeled sets representing both generic 'authorized user/attacker' behavior and specific 'authorized user/attacker' entity behavior.

One way to curate a dataset would be to develop a sufficient number of attack word labelling rules, obtain a corpus of malware, build out a testing lab, detonate the malware used by an attacker in their initial stages of attack in the lab environment with the system's agent running and collecting corresponding attack words graphs. The issue with this approach is that it is time consuming, requires a lot of engineering and financial resources, and very often the malware for complex campaigns has to be able to communicate with its command and control center to operate.

An alternative approach would be to utilize existing Large Language Models (LLMs), such as OpenAI's GPT (Generative Predicting Transformer) or Meta's LLaMA (Large Language Model Meta AI) which can be fine-tuned through transfer learning to be able to synthesize attack word graphs from raw body of free text. The free body of text can be obtained from public or private infosec threat reports describing attack campaigns.

Both the foregoing general description and the following detailed description are exemplary and explanatory only and are not restrictive of the disclosed embodiments, as claimed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

WEI, et al., DeepHunter: A Graph Neural Network Based Approach for Robust Cyber Threat Hunting, available from https://arxiv.org/abs/2104.09806 (Apr. 20, 2021);

HASSAN, et al., Tactical Provenance Analysis for Endpoint Detection and Response Systems, The Internet, available from https://adambates.org/publications/ (May 18, 2020);

BENGIO et al., A Neural Probabilistic Language Model 2003, Journal of Machine Learning Research 3 (2003), available from https://www.jmlr.org/papers/volume3/bengio03a/bengio03a.pdf; and VASWANI et al., Attention Is All You Need, The Internet, available from https://arxiv.org/abs/1706.03762 (Jun. 12, 2017).

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIGS. 15A-C illustrate exemplar software code.

DETAILED DESCRIPTION

The systems and methods are configurable to use cloud hosted applications, e.g., applications that execute in a client server manner across a network with much of the application residing within a public or private cloud with a subset of the application logic residing on or executing on a local device. As will be appreciated by those skilled in the art, such cloud hosted applications may exist as standalone 'apps' on a local device or by accessed through general purpose applications such as a web browser. For context, social media applications are applications that can primarily be cloud hosted and exist to exchange media and information between multiple user entities where user entities in some manner can contribute media or information to other users with or without moderation. Information can include behavioral information. A social network application could also be used interchangeably with social media within the descriptions. Social network applications include, but are not limited to, Twitter, Twitch, Facebook, YouTube, Discord, and Instagram.

Figure 1:
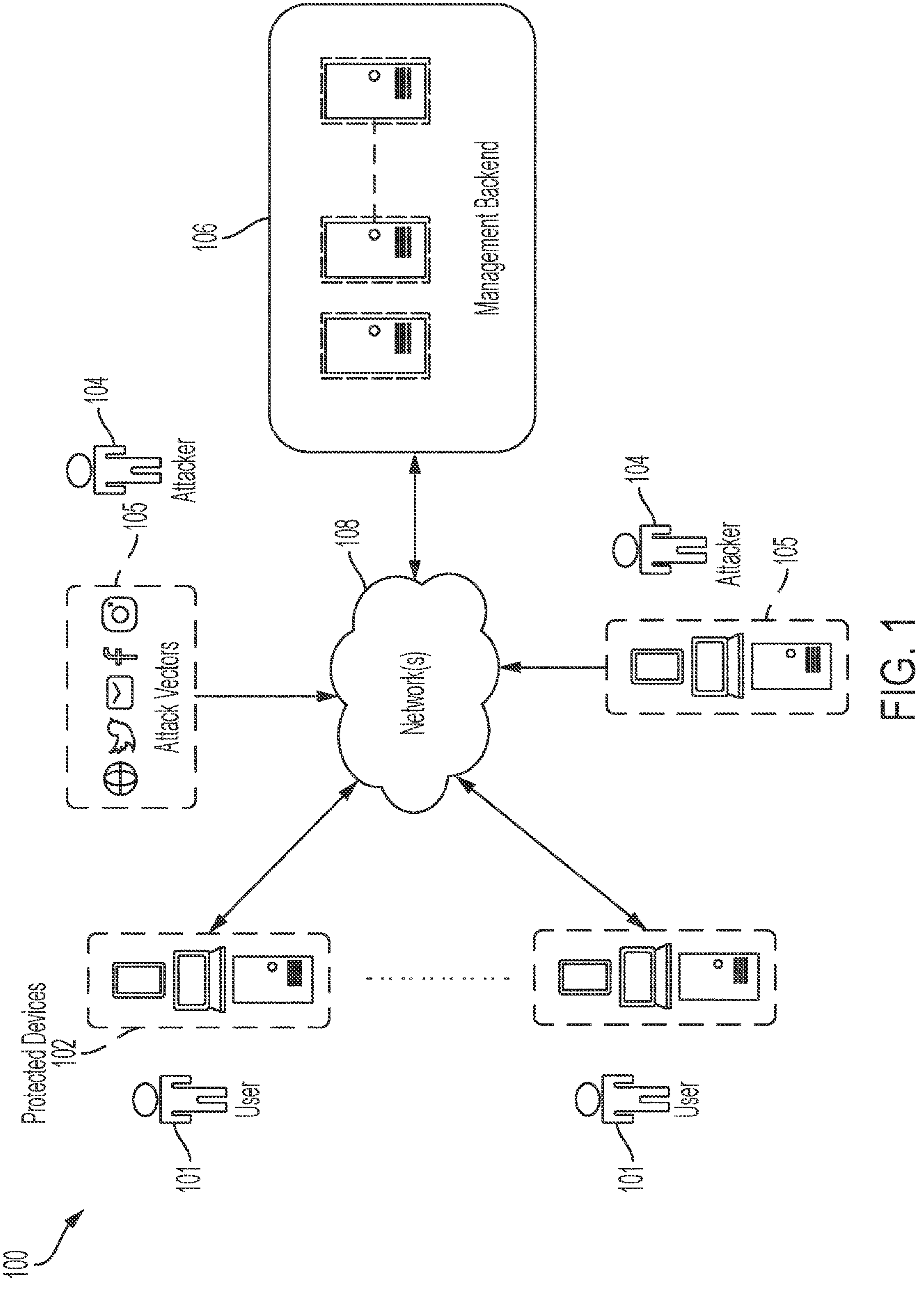
FIG. 1 illustrates an architecture with multiple users, the ensemble of protected devices, various attack vectors that are protected by (up to and including social media) and a backend responsible for configuring protecting devices and collecting telemetry.

FIG. 1 illustrates an architecture with multiple users 101, the ensemble of protected computing devices 102 each representing a protected computing environment. As will be appreciated by those skilled in the art, the computing environment can be subject to a method of gaining unauthorized access to a network or computer system (e.g. attack vector) and an attack surface is the total number of attack vectors an attacker can use to manipulate a network or computer system or extract data Each user 101 can have one or more protected devices within a protected computing environment, or may share devices within a protected computing environment with other users, a protected computing environment can even include computing resources not directly owned by the user such as those that implement a cloud hosted application that a user has an account with, various attack vectors 104 that are monitored including low level network data, and higher level application data such as a device local or cloud hosted social media application, and a management backend 106 responsible for configuring protecting devices and collecting telemetry, are connected through one or more public or private networks 108. Attack vectors 105 are monitored by a variety of methods including direct inspection of data sent to a protected device 102 across the network 108 before or as part of the protected computing device 102 operating systems' networking stack, or as indirect artifacts such as a downloaded file, resulting operating system events when downloaded files are evaluated, edited or executed by the user 101 or protected computing device 102 operating system. Indirect operating system events could also result from network data that resides in the protected devices memory or other forms of temporary or permanent storage as well. Attack vectors 105 could include social media applications and could be monitored within the social media application executing on the device or hosted within another application such as a web browser or using cloud hosted Application Programming Interfaces (APIs) either directly from the protected computing device 102 or from the management backend 106.

Figure 2A:
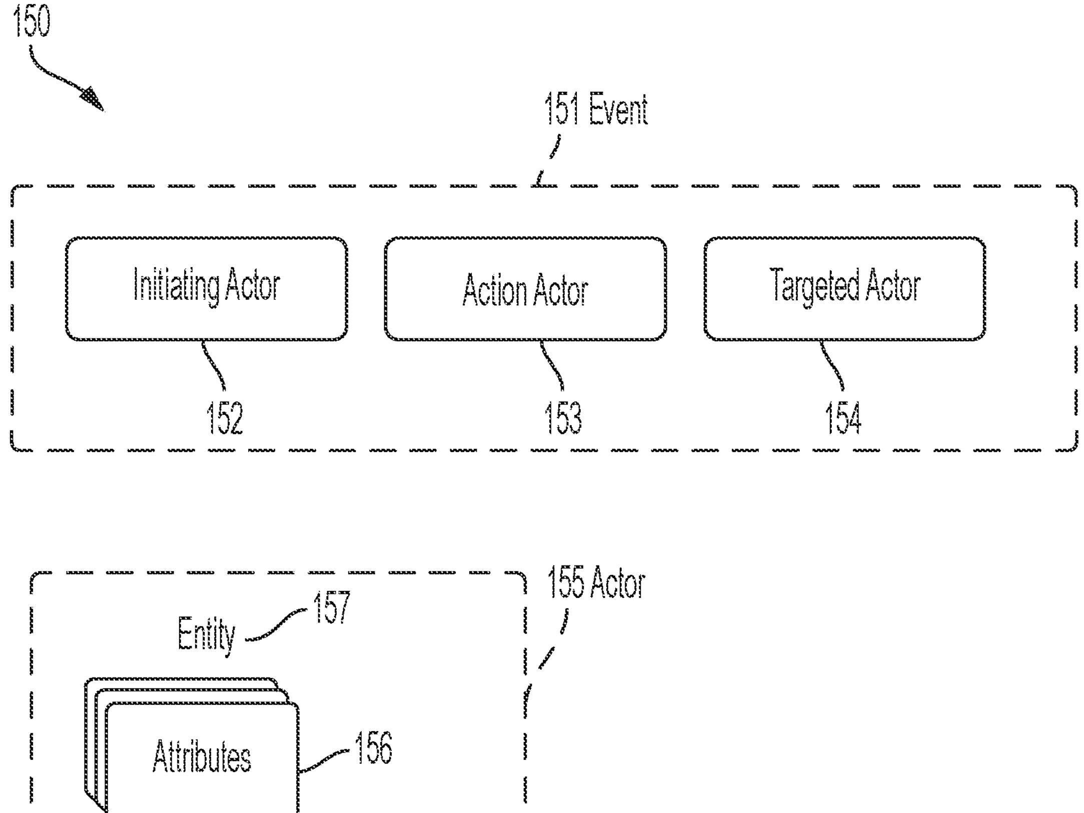
FIG. 2A illustrates an abstract event within the attack graph.

FIG. 2A illustrates an abstract event 151 comprising actors representing roles within an attack graph 150, which is a model-based approach for network-security analysis. In some situations, events are composed of at least a triplet of entities comprising: the initiating actor 152, the action actor 153, and the targeted actor 154 within the event 151. Overall, the abstract event 151 describes one or more attack activities that in some manner is changing an overall state of the protected computing system, even if the change achieved is a trivial change. An example of a trivial change might be, for example, changing the last modified timestamp on a file. Such time stamps are advisory only and can be easily modified by any application and does not change the operating behavior of most applications and the change itself can be easily reversed. An example of a non-trivial change might be the modification or deletion of application data. Such changes are likely to cause applications not to function correctly or as intended and are more difficult to reverse and may require using backup data sources to restore the modified or deleted data to some previous version of the date. Entity attributes include data and metadata about the entity 157. The collection of attributes 156 about an entity 157 is called an actor 155. Each actor 155 (initiating actor 152, action actor 153, and targeted actor 154) has a collection of attributes 156 about an entity 157.

The initiating actor 152 is the entity 157 directly causing or requesting the event to occur. The action actor 153 is the actor that the initiating actor 152 is attempting to take that has or potentially could change the state of the protected computing environment is another entity. The entity that is being targeted 154 by the action actor 153 is the third actor. The targeted actor 154 does not necessarily need be the entity that will be changed by the event, although the targeted actor 154 frequently is changed by the event 151. The changed entity could be either the initiating actor 152 or the targeted actor 154 or potentially another entity within the protected computing environment that is not part of the triplet of entities within the event 151.

The entities represented by the initiating actor 152 and targeted actor 153 could be different entities, but could also be the same entity. The entity when represented as an actor may have different attributes depending on its role within an event as either an initiating actor 152 or targeted actor 154.

Initiating actor 152 and targeted actor 154 can have different fundamental object types. For instance an event 151 describing a process opening a file would have a process object as the initiating actor, the action of opening a file as the action actor 153 and the file being opened as the targeted actor. The actors could also be entities that exist outside of the protected computing device and represent attack vectors 105 such as users on a social network or computers on a network 108. While an event 151 comprises at least these three actors, the initiating and targeted actors can appear in multiple events over time or even at the same time, however the action actor 153 is unique to each event. An event 151 can have additional entities that represent a hierarchical relationship to one of the initiating actor 152 or targeted actor 154 such as the protected computing device 102, the user 101 or the network 108.

The individual actors (e.g., initiating actor 152, action actor 153, and targeted actor 154) or subsets of actor attributes could be stored into a directed graph store 218 with edge connections between any of the individual actors and the node property labels for the individual actor attributes. Similarly entire events could be stored in a directed graph store 218 with causal relationships between events 151 and node property labels for key elements of actor attributes.

Figure 2B:
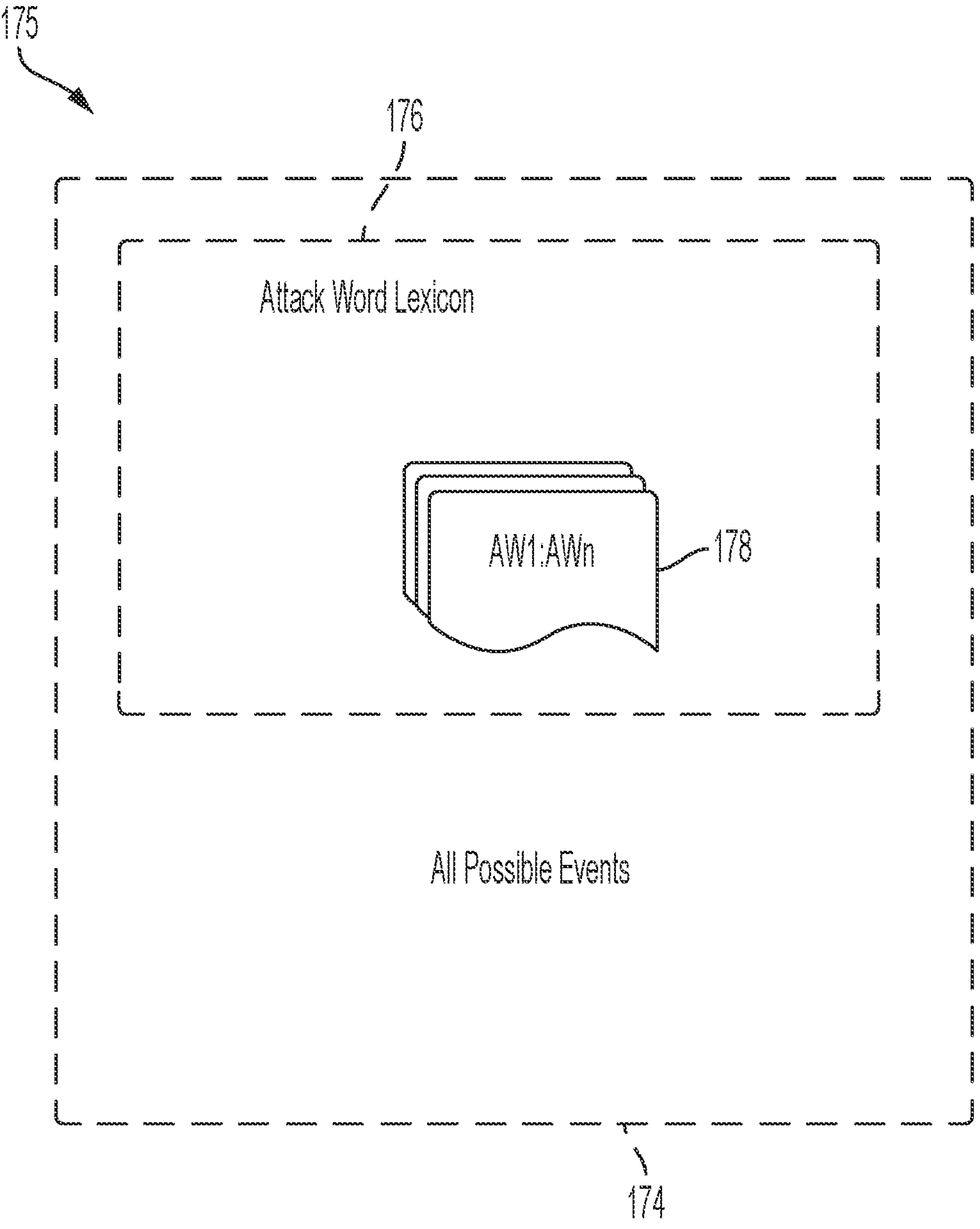
FIG. 2B illustrates that attack words (AW) are a subset of possible events.

FIG. 2B illustrates the relationship between the attack words lexicon 176 which comprises individual Attack Words AW1:AWn 178 where n is the attack lexicon size relative to possible events 174. The attack words lexicon 176 is a subset of possible events 174. Fundamentally Attack Words correspond to events 151 or discrete sequences of events, but are members of the subset that makes up the attack words lexicon 176. Note that this AWn tagging schema is used to illustrate the attack word concept. As will be appreciated by those skilled in the art, many tagging schemas can exist and/or be used without departing from the scope of the disclosure.

It is also possible multiple kinds of events or event sequences can represent the same attack word. Attack words are a more abstract representation of the tactical action that an attacker may be taking than the specific event that has been classified as an attack word. The precise lexicon of attack words is not static and can change over time as new attack words are added when the new attack words are observed to be used by attackers and older attack words are retired as the older attack words fall out of usage by attackers. An example of an attack word might be an event that has an initiating process executing a file from the system temporary directory. This event could be classified as an attack word within the attack word lexicon as AW70. Another event might be an initiating process executing a file from a user's temporary directory. This event could also be classified as an attack word within the attack word lexicon as AW70. Both events describe unique behaviors, but both describe the general behavior assigned to AW70 for purposes of example of executing a file from a temporary location.

Figure 3:
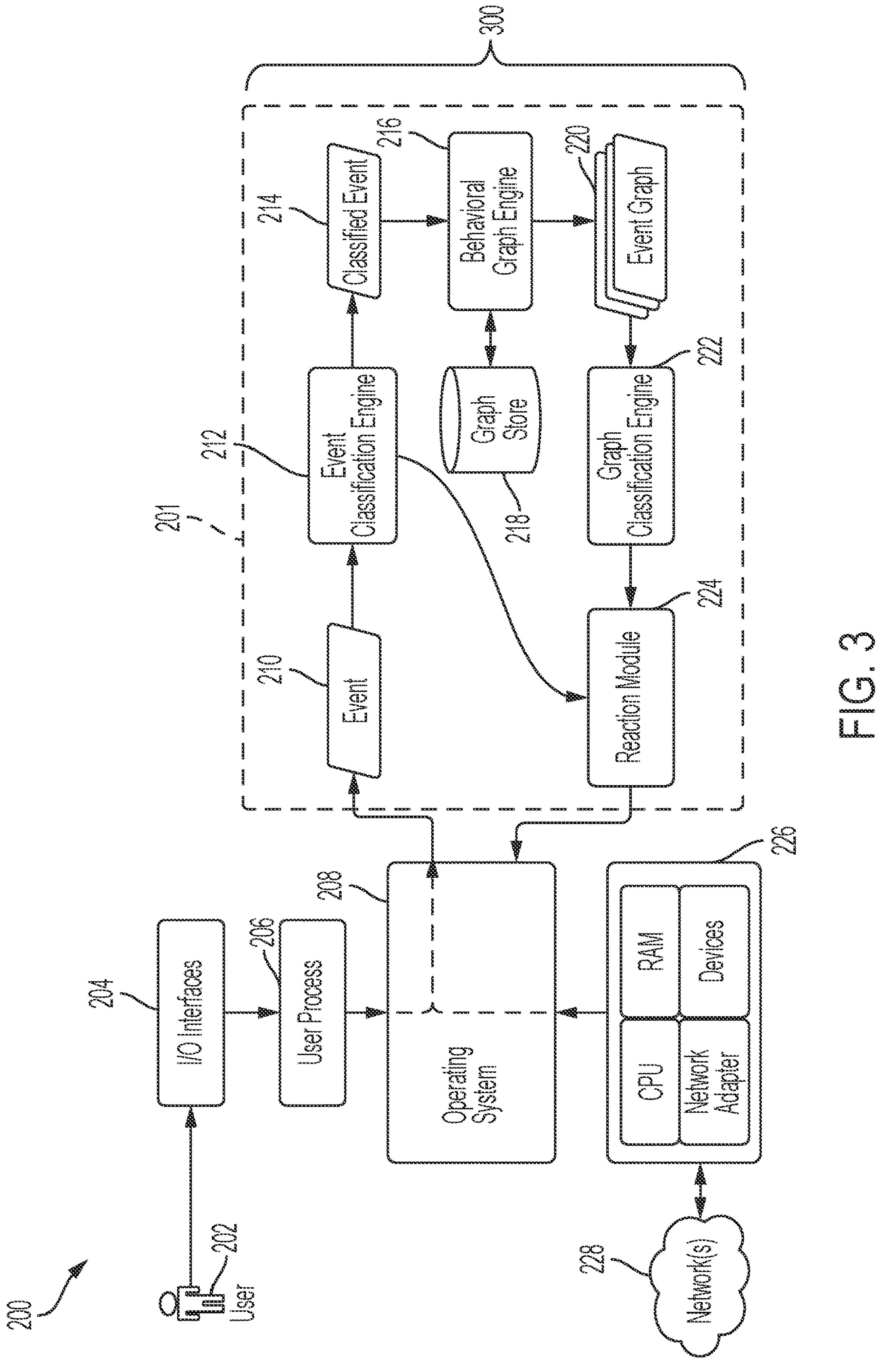
FIG. 3 illustrates the functional relationship between the different modules comprising a behavioral anti-malware engine, running on a protected device.

FIG. 3 illustrates the functional relationship between the different modules 200 comprising a behavioral anti-malware engine 201, running on a protected computing device within the protected computing environment. The functional relationships provide for a system of operating an anti-malware behavioral graph engine comprising: a memory; a processor in operable communication with the memory, the processor operable to provide instructions and data and perform steps which include providing behavioral information by developing a model from an attack language comprising two or more attack words wherein the model is operable to detect at least one of a complex attack and a multi-stage attack; semantically completing the attack language to describe one or more attack activities; predict one or more of a tactical attack goal and a strategic attack goal from the semantically complete attack language; using the semantically complete attack language as an input into a high level scripting environment to repeat an attack upon a computing environment; and determining a causal relationship between two or more events. A computer-readable storage medium configured with data and programmed instructions can also be utilized which, upon execution by a processor, perform a method to detect malware in a computer network.

The protected device comprises hardware resources 226, a device operating system 208 that manages device hardware resources 226 including input/output (i/o) devices 204 and network interface devices that connect the protected device to public or private networks 228. In some manner the device operating system 208 creates an abstraction called a user process 206 that represents some amount of the managed hardware resources 226 that a user 202 can interact with through i/o devices 204. Many operating systems support multiple concurrent processes and can support multiple concurrent or serial user entities 202. The behavioral anti-malware engine 200 comprises modules that monitor or actively filter; the use of hardware and abstract process resources, interface with device local application or cloud hosted application APIs, on device or on network monitoring of network traffic, to generate possible events 174, an event classification engine 212 that processes events against a corpus of rules in order to either invoke a reaction module 224 and/or classify an event 214 as being a member of an attack words lexicon 176 or not; a behavioral graph engine 216 that evaluates based on the attack word classification (or lack of) of the classified event 214 how to store the classified event 214 into a directed graph store 218. From the directed graph store 218 graphs of related classified events 220 can be found that are further processed by the graph classification engine 222 to determine an appropriate mitigating reaction module 224 to invoke. Reaction modules 224 can include direct modification of the event 210 to cause the operating system, local or cloud application to allow or disallow the action, change the targeted actor of the event, or remove/modify one or more entities from the event (such as terminating a process, deleting a file, or removing a malware infection from a file). The specific steps each module takes are further described in FIG. 4.

Figure 4:
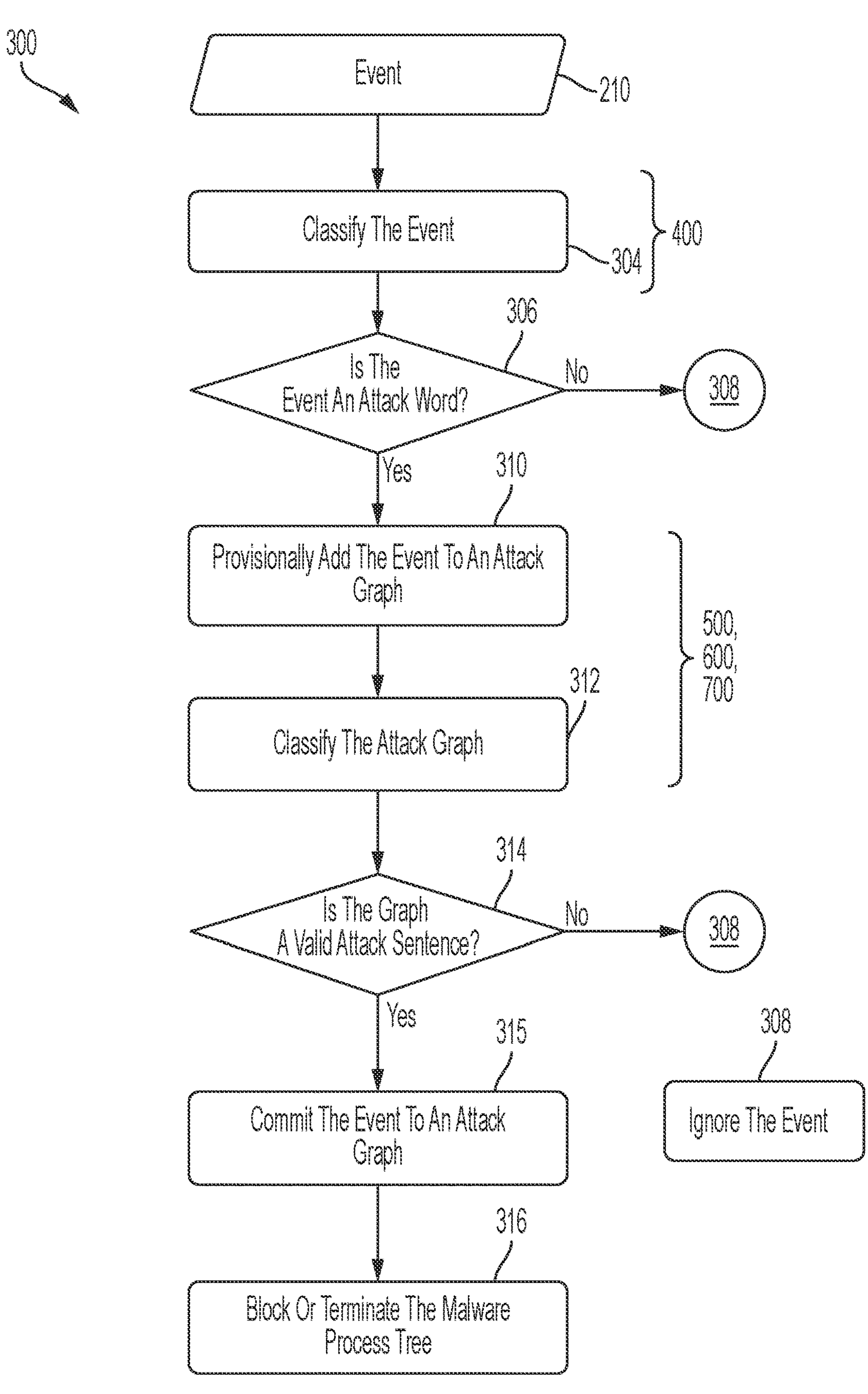
FIG. 4 is a high-level illustration of the steps associated with filtering an event.

FIG. 4 is a high-level illustration of the filtering steps 300 associated with filtering an event 210 from the protected device described in FIG. 3 within the behavioral anti-malware engine described in FIG. 3. The process disclosed can be part of a system for classifying an event for an anti-malware behavioral graph engine comprising: a memory; a processor in operable communication with the memory, the processor operable to provide instructions and data and perform steps which include providing behavioral information by classifying an event; determining if the classified event is an attack word, wherein if the classified event is not an attack word, ignoring the event and if the classified event is an attack word provisionally adding the event to an attack graph; classifying the attack graph; determining if the attack graph is a valid attack sentence, wherein if the attack graph is not an attack sentence, ignoring the event and if the attack graph is an attack sentence, committing the event to the attack graph; and if the event is not ignored, blocking or terminating a malware process tree. A computer-readable storage medium configured with data and programmed instructions can also be utilized which, upon execution by a processor, perform a method to detect malware.

Figure 5:
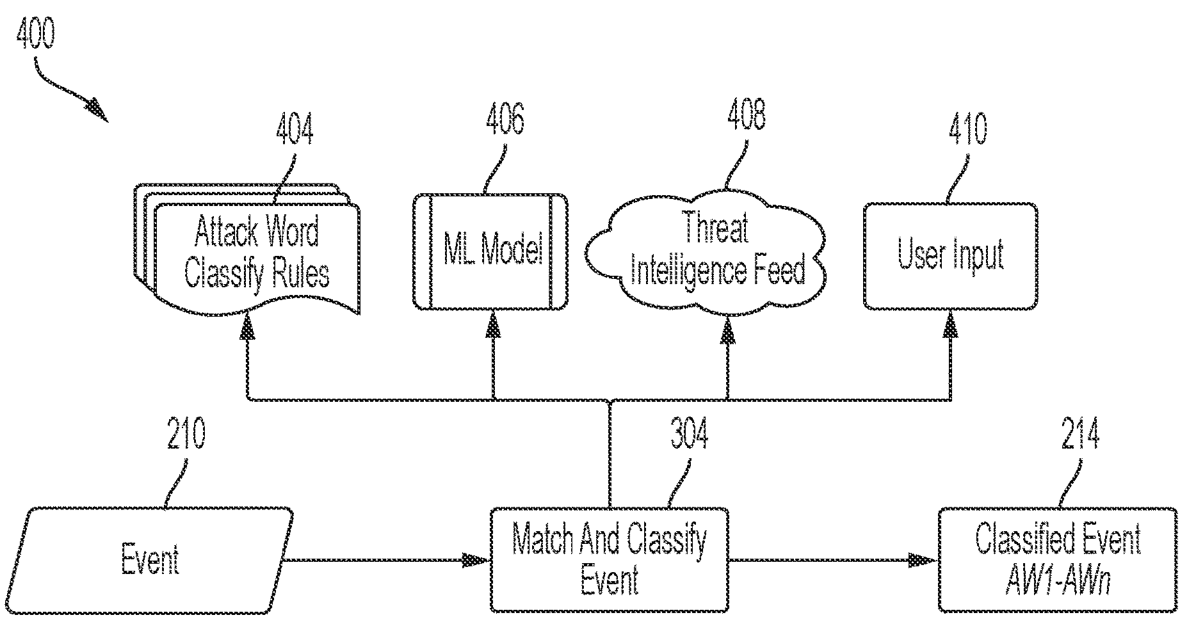
FIG. 5 illustrates the event step in a classification process.

The event is classified 304 to provide an output of the classified event 214, the event classification step is described in more detail in FIG. 5. Next the system makes a decision of whether the event is an attack word 306 by determining if the classified event 214 is recognized as an attack word 178. The attack word is then provisionally appended to the attack graph 310 or the event is discarded by taking ignoring the event 308. After provisionally appending to the attack graph 310 the attack graph is classified 312. Once the attack graph is classified, a decision is made to determine if the attack graph is a valid attack sentence 314 by determining the provisional graph forms a coherent attack sentence, or a prefix fragment of a coherent attack sentence. If the graph is not a valid attack sentence (NO), then the event is ignored 308. If the attack graph is a valid attack sentence (YES), then the event is committed to the attack graph 315. Once the event is committed to the attack, the malware process tree is blocked or terminated. 316.

The process of blocking or terminating 316, is a remediation step which can include terminating the process, terminating the process tree starting with the actor and/or quarantining the process's image file in the case of a process entity, or possibly banning or blocking a user in the case of a social media entity. In block or terminate step 316 if the extended graph is recognized as being a prefix fragment of a coherent attack sentence by decision step 314, the next possible attack words can be predicted by the classification engine in classification step 312 and remediation steps taken including placing restrictive or sandboxing rules on actors in the attack sentence that would prevent the predicted next attack words from impacting the protected computing environment, other entities that do not share the same attack graph (such as other processes or users in a social media application) would not be restricted by these predictive rules. Examples might include preventing a process with an attack sentence fragment from executing files from the system temp directory, but not restricting other processes from doing so, or blocking a direct message containing a URL link from a specific social media user, but allowing other users to send direct messages containing such URL links.

FIG. 5 provides further detail about the classification of event step 304 in FIG. 4 using an event 210 to create a classified event 214. During the classification of event 400 the event 210 is checked against one or more classification engines, which can include one or more bespoke attack words 178. Classification rules 404 are developed by a threat team and a machine learning (ML) model classification engine 406 trained to recognize non-trivial events; especially prominent for events coming from a social media vector; real-time check against a threat intelligence feed classification engine 408 operable to processing one or more threat intelligence feeds. Additionally, a feed check is performed against user flagged attack vectors classification engine 410. The check can include malicious websites, social media agents, computer media, etc. where a user is given an opportunity via a user-interface to voice an opinion about the content or behaviors they see or perceive. Other classification engines can exist but are left out of this illustration. Classification engines can invoke reaction modules 224 and/or apply zero, one or more attack words 178 (e.g., AW1:AWn) classification tags to the output classified event 214. It is possible for multiple events to constitute an attack word, such classifications would require the maintenance of state within one or more of the actors; a classified event 214 can be classified with multiple AW1:AWn 178 tags from one or more: classification rules 404, ML model classification engine 406, threat intelligence feed classification engine 408, and user flagged attack vectors classification engine 410 within FIG. 4 Step 304.

Figure 6:
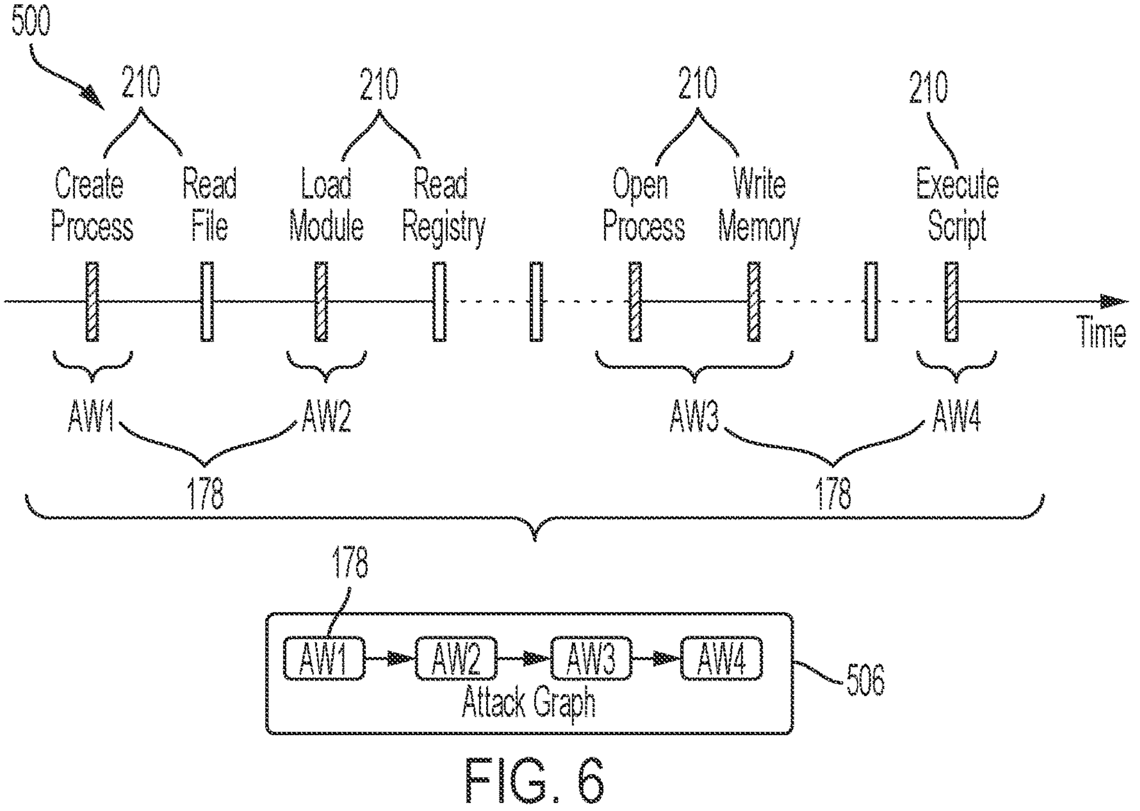
FIG. 6 illustrates the processing of temporally ordered sequences of events originating from the same initiating actor (a process)

FIG. 6 illustrates processing of temporally ordered sequences of events 210 originating from the same process to form an attack graph 506 either provisionally as in FIG. 4 the step of provisionally adding the event to an attack graph 310 or the step of committing the event to an attack graph 316 in FIG. 4. Classified Events 214 that are classified as attack words AW1: AWn 178 in FIG. 4 Step 304, are added to an attack graph 506 belonging to the initiating actor; classified events 214 that are not AW1:AWn 178 classified are ignored. AW1:AWn 178 tagged events can be associated with graphs that are logically attributes of any actor in an event 151, a process and the initiating actor is chosen here to illustrate the concept due to the clarity of time order graph construction it provides. Note that AW3 in this illustration comprises a sequence of events that together make up the AW3 attack word.

Figure 7:
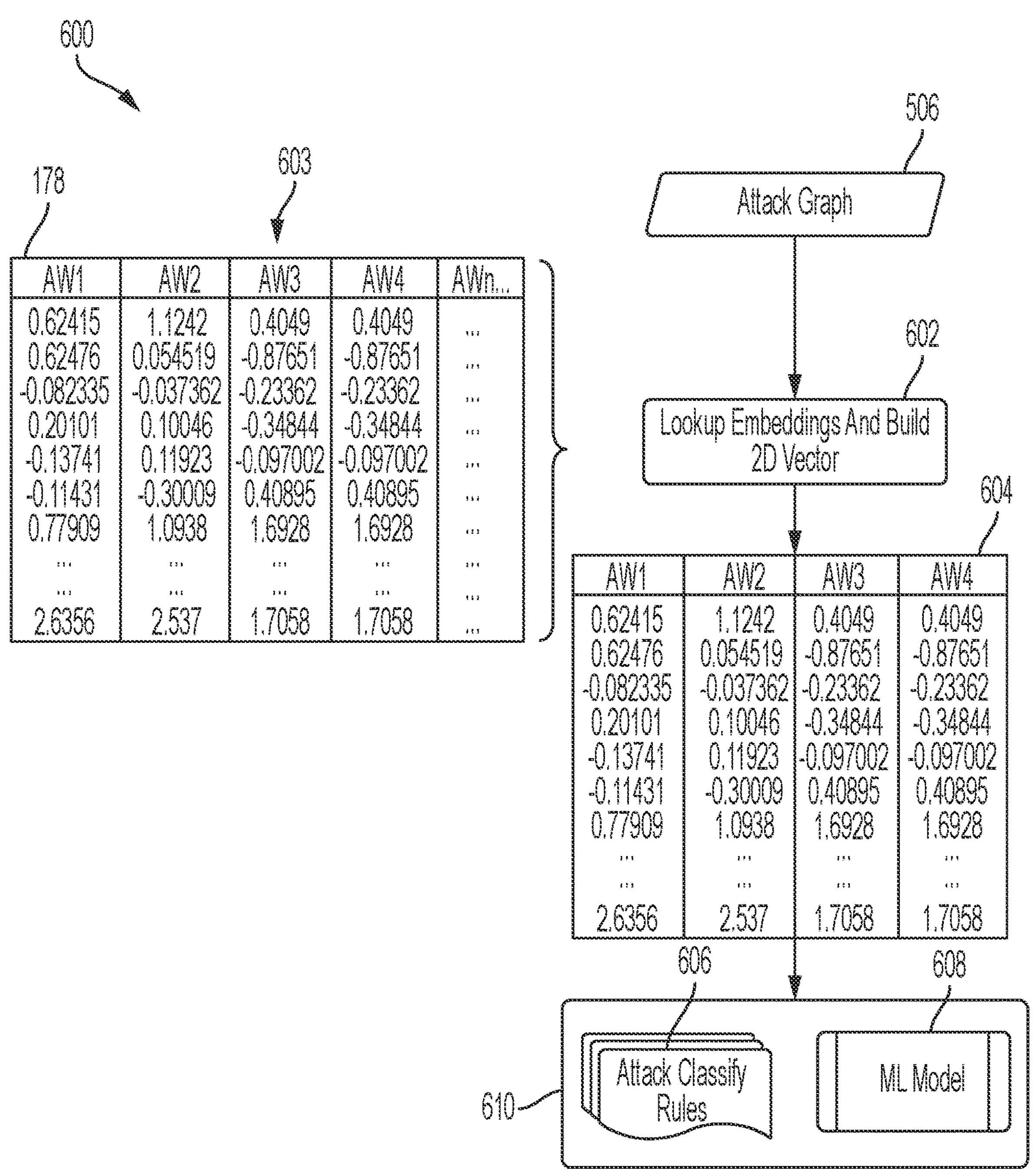
FIG. 7 illustrates the classification of an attack graph.

FIG. 7 illustrates the classification of an attack graph 506; the anti-malware engine 610 works with a lexicon of attack words, where each AW1:AWn 178 is represented as an embedding of the attack word embedding vector 603 of length L; with the higher the dimension of the embedding, the more accurate will be represented the relations between attack words in an attack sentence; practical values are 16-100; every AW in the graph is looked-up in Step 602 from the attack word embedding vector 603 and the graph is represented with a two dimensional matrix 604 M×L, where M is the number of nodes/AW in the graph and L is the dimension of the embedding vector; the graph can be classified by either bespoke attack rules 606 or by an ML model 608 such as a Long Short-Term Memory (LSTM) architecture model.

Figure 8:
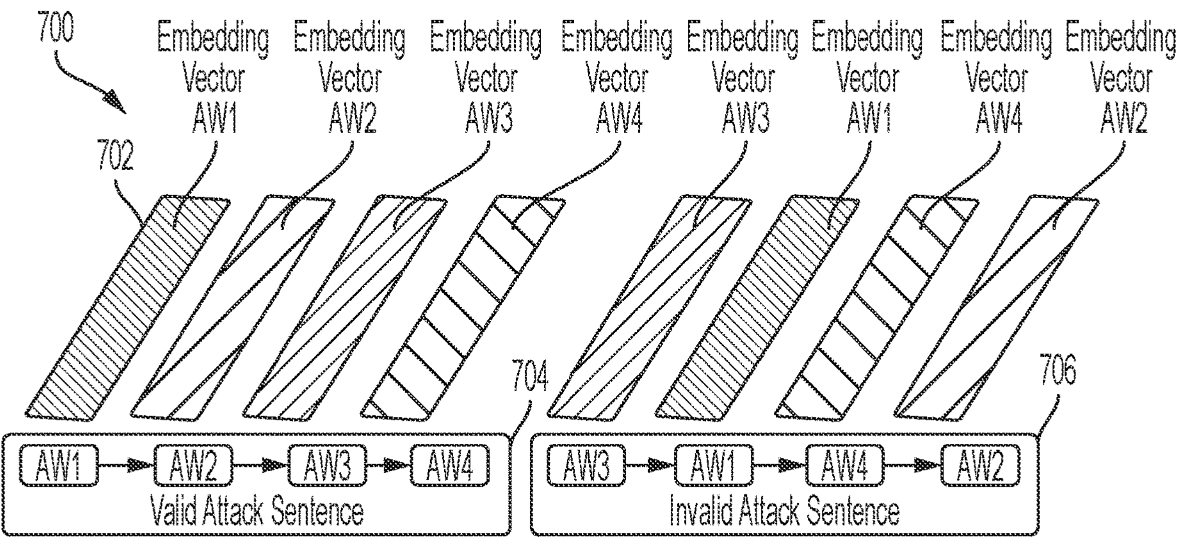
FIG. 8 illustrates two attack graphs, both having the same number of nodes/AW, but the valid attack sentence was classified as a valid attack sentence, while the invalid attack sentence was not.

FIG. 8 Illustrates a valid attack sentence 704 and an invalid attack sentence 706 graph both having the same number of nodes/AW, but valid attack sentence 704 was classified as a valid attack sentence, while the invalid attack sentence 706 was not. The valid attack sentence 704 is composed of lexically and grammatically correct attack words forming an attack sentence. The invalid attack sentence 706 graph is composed of lexically correct attack words but not in a grammatically correct attack sentence. Invalid graphs such as 706 need not be stored within the directed graph store since they do not indicate attacker behavior. The valid graph 700 is not guaranteed to be semantically meaningful and representative of attack behavior, however the decision space for the behavioral anti-malware engine is significantly reduced between false and true positives through this evaluation.

Figure 9:
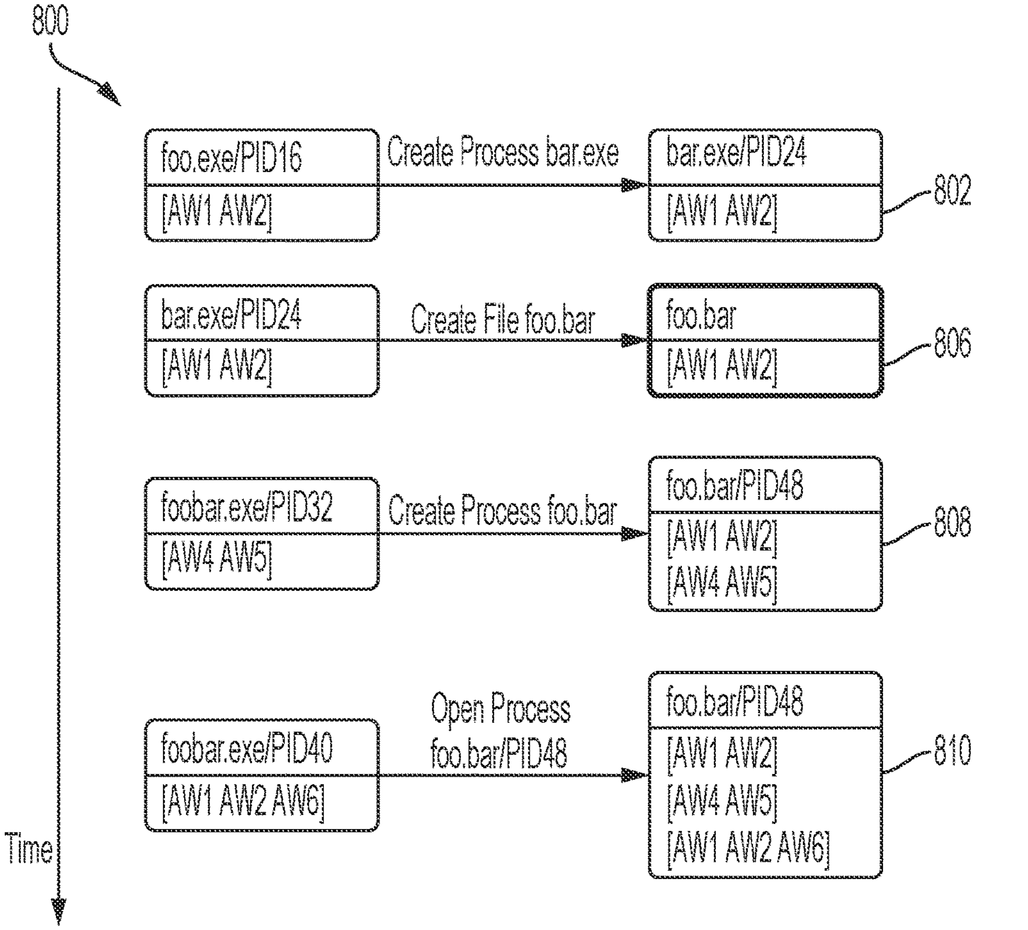
FIG. 9 illustrates how graphs are extended and the causality relationship between different actors.

FIG. 9 Illustrates the causality relationship between different attack words nodes within the directed graph store. Events 151 can represent interactions between entities that influence or direct later actions of targeted entities, these are causal relationships since earlier events can influence later events. The classification engine 212 can also use a rule set in addition to attack word classification rules that detects events indicating causal relationships between actors and can arrange for graph nodes to be linked according to the causal relationship that is established by the event.

Some causal relationship indicating events are also attack words and attack graphs may also be extended by the same event with AW1:AWn 178 labeled events creating new attack word nodes within the graph, conversely some causal relationship indicating events will not be classified as attack words and do not extend graphs, however they may create new links within the graph between actor entities and attack words.

Some examples of causal relationships are diagrammed using process and file entities as an example. A process is created from a file with a name, and the specific instance of the process is then identified with a Process ID Number (PID). Processes created from the same file will have distinct PID numbers and are separate entities from the point of creation from other processes created from the same file. While process and file entities are used here to demonstrate causal relationships, the entities could be social media user entities, device entities and so on.

Example 802 when a child process (bar.exe/PID24) is created, the parent initiating actor process entity (foo.exe/

PID16) already has a graph that has been assigned to it by the steps in FIG. 4. The existing graph of the parent initiating actor (foo.exe/PID16) is transferred to the targeted actor child process (bar.exe/PID24).

Example 806 an attack graph is transferred from the initiating actor process (bar.exe/PID24) to the targeted actor file it has created (foo.bar), this is an example of a targeted actor being of a different entity type from the initiating actors.

Example 808 a newly created targeted actor process (foo.bar/PID48) inherits the graphs of both its initiating actor parent (foobar.exe/PID32) and the file representing the main module (foo.bar), the targeted actor child process (foo.bar/PID48) now has two attack sentence graphs, one from the parent process foobar.exe/PID32 and another from the file foo.bar.

Example 810 when an initiating actor process (foobar.exe/PID40) opens a handle with modifying right to a targeted actor process (foo.bar/PID48), the graph of the initiating actor process (foobar.exe/PID40) is transferred to the targeted actor process (foo.bar/PID48), the targeted process (foo.bar/PID48) now has three attack sentence graphs, one from its original parent process actor (bar.exe/PID24), one from its image file (foo.bar) and a third from the opening process (foo.bar/PID48).

Other causal relationships exist and the specific events that are causal are determined by the semantics of the protected device operating system 208, network, or device local or cloud hosted social media application.

The resulting directed graph store can be queried from any given entity to discover any attack words that have a providence relationship with it (i.e. looking back in time) or any attack words having a causal relationship with it (i.e. looking forward in time). This query ability is used to build specific paths through the graph store that are evaluated as attack graphs 506 to classify if they represent valid attack sentences such as the valid attack sentence 704 graph.

Figure 10:
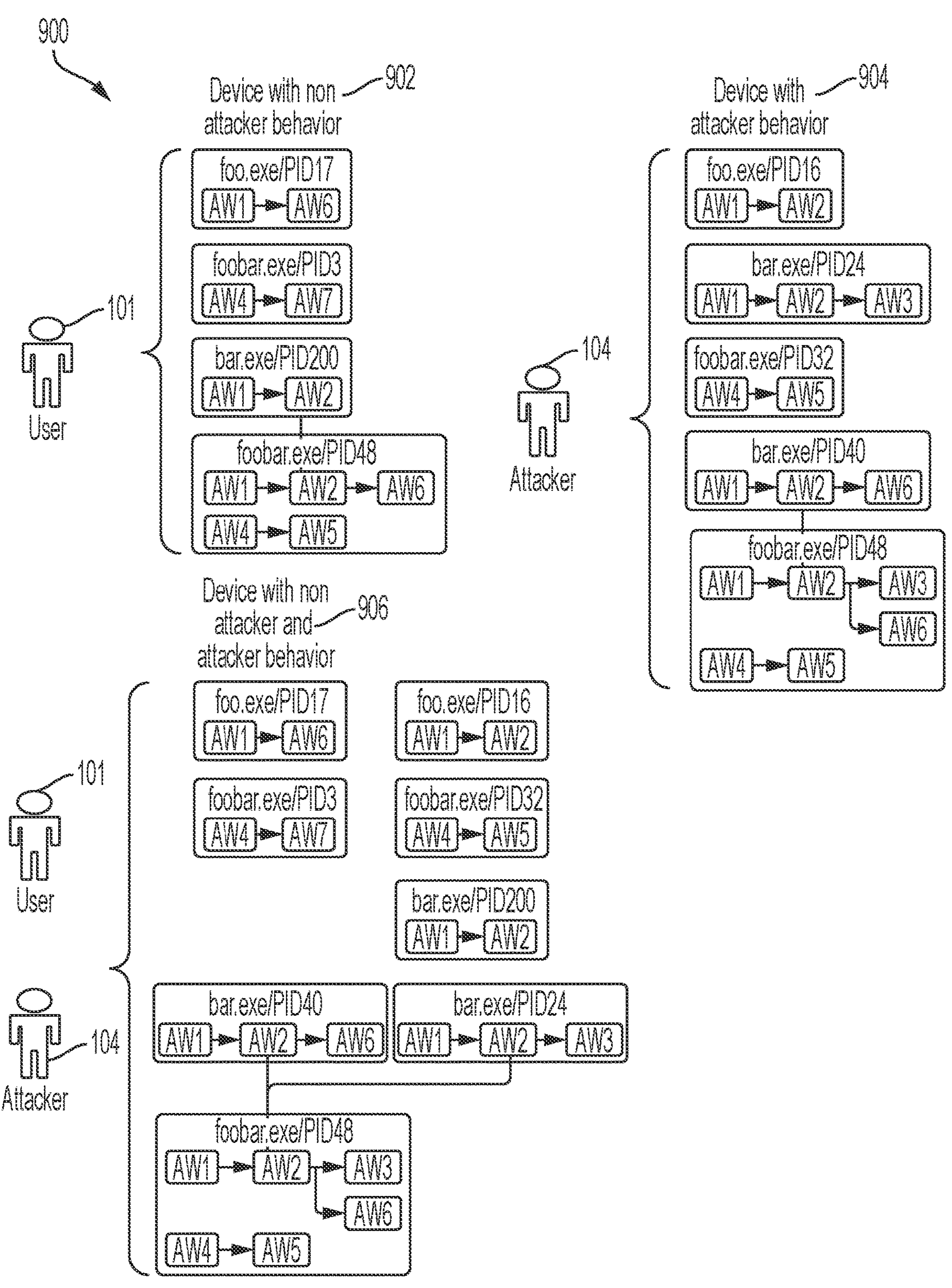
FIG. 10 illustrates establishing user and attacker identities based on the overall attack graph state.

FIG. 10 illustrates establishing an entity identity for two distinct entities based on the observed attack word sentence graphs. As illustrated the entity could be a user 101 or an attacker 104 identity, which can be an attack vector, based on the overall attack graph state of a given device with non-attacker behavior 902, device with attacker behavior 904, and/or device with non-attacker and attacker behavior 906.

A device with non-attacker behavior 902 has a user 101 and will exhibit some "normal" usage patterns, which are described by the collection of attack graphs, which while valid attack sentences or fragments are not true positive indicators of an attack. Such sentences represent lexically and grammatically correct valid attack sentence 704, but lack semantic meaning of an attack. Such sentences still have value within the system to be used as negative samples for deriving more accurate models, both as a general 'normal user' behavior as well as a specific user entity enabling future models to predict both normal and specific user entity identities. Such behavior is illustrated using process entities, but the behavior could also be social media user entities and anomalous behavior could indicate a compromised account; such as a user entity suddenly sending messages atypical of the behavior of that user entity.

On devices with attacker behavior 904 the identity of the attacker 104 can be established by looking at patterns of attack sentences across different protected computing devices in a computing environment. These patterns will reflect upon the cognitive approach of the attacker entity to achieving the attack by abstracting the tools, tactics and methods they employ in the attack to the higher level attack words being used. Such an identity relates to the activity of a given attacker and can be used with other information to establish correlation between attacks that may use different tools, tactics and methods. Such behavior is again demonstrated using process entities on a device, but the behavior could also be social media user entities sending messages intended to compromise the target user entity in some manner.

Given the identities established by patterns in 902 and 904 it is possible to identify both the attack vectors 105 for an attacker 104 and the user 101 on a device with both user and attacker behavior 906. While aspects of the attack graphs are similar, it is possible to find distinct differences in behavior that can be used to identify attacker behavior as a distinct set from user behavior. These differences between user and attacker behavior can be used to attribute attacks to attacker entities or enhance models to detect attack sentences as true positive attacks and mitigate the attack.

Additionally even if the attacker identity is not known either generally or specifically, a deviation of the overall graph state from the normal user identity can also be used for anomaly detection, which can indicate new attack behavior.

Figure 11A:
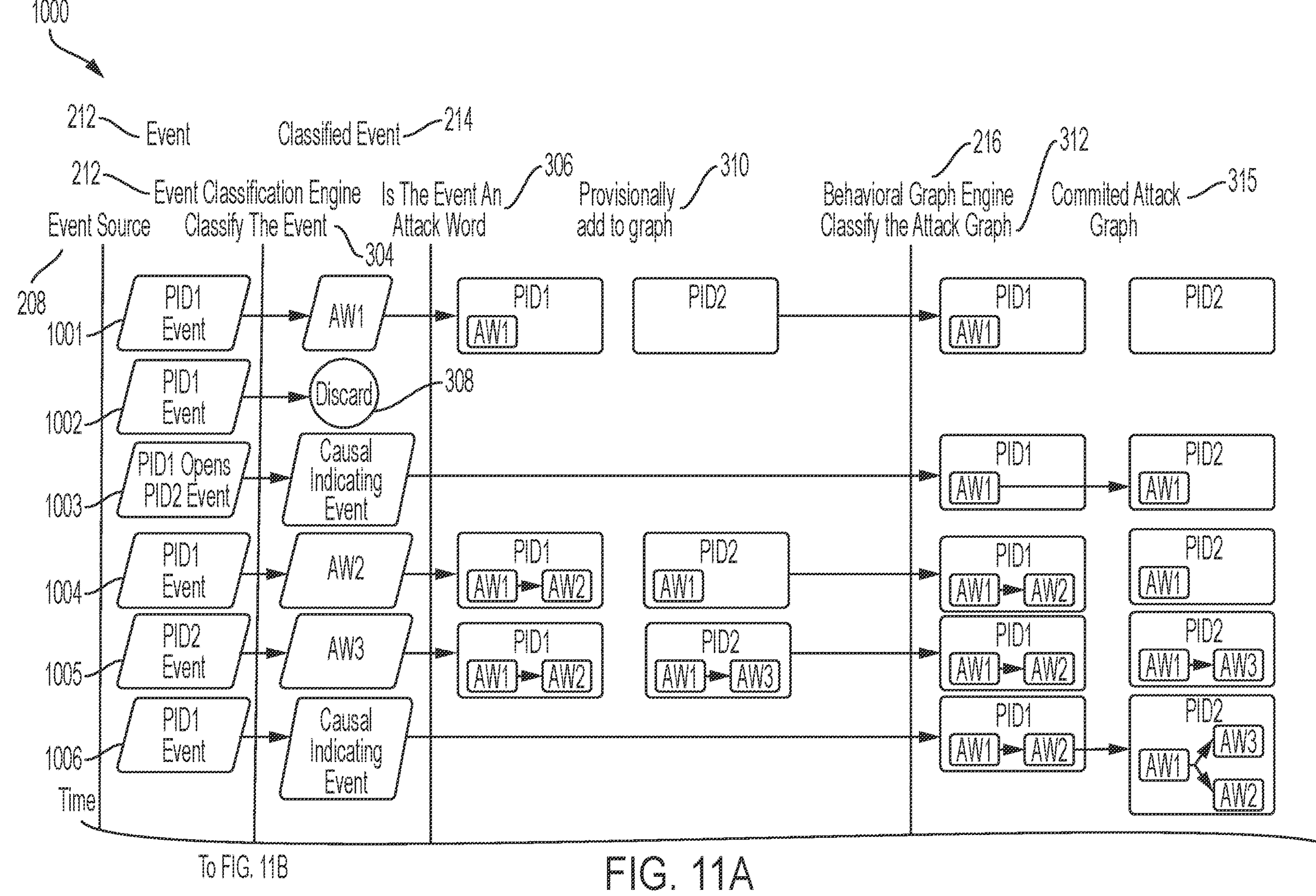
FIG. 11 illustrates how the Behavioral Anti-malware Engine works with a stream of events from multiple actors with different outcomes illustrated.
Figure 11B:
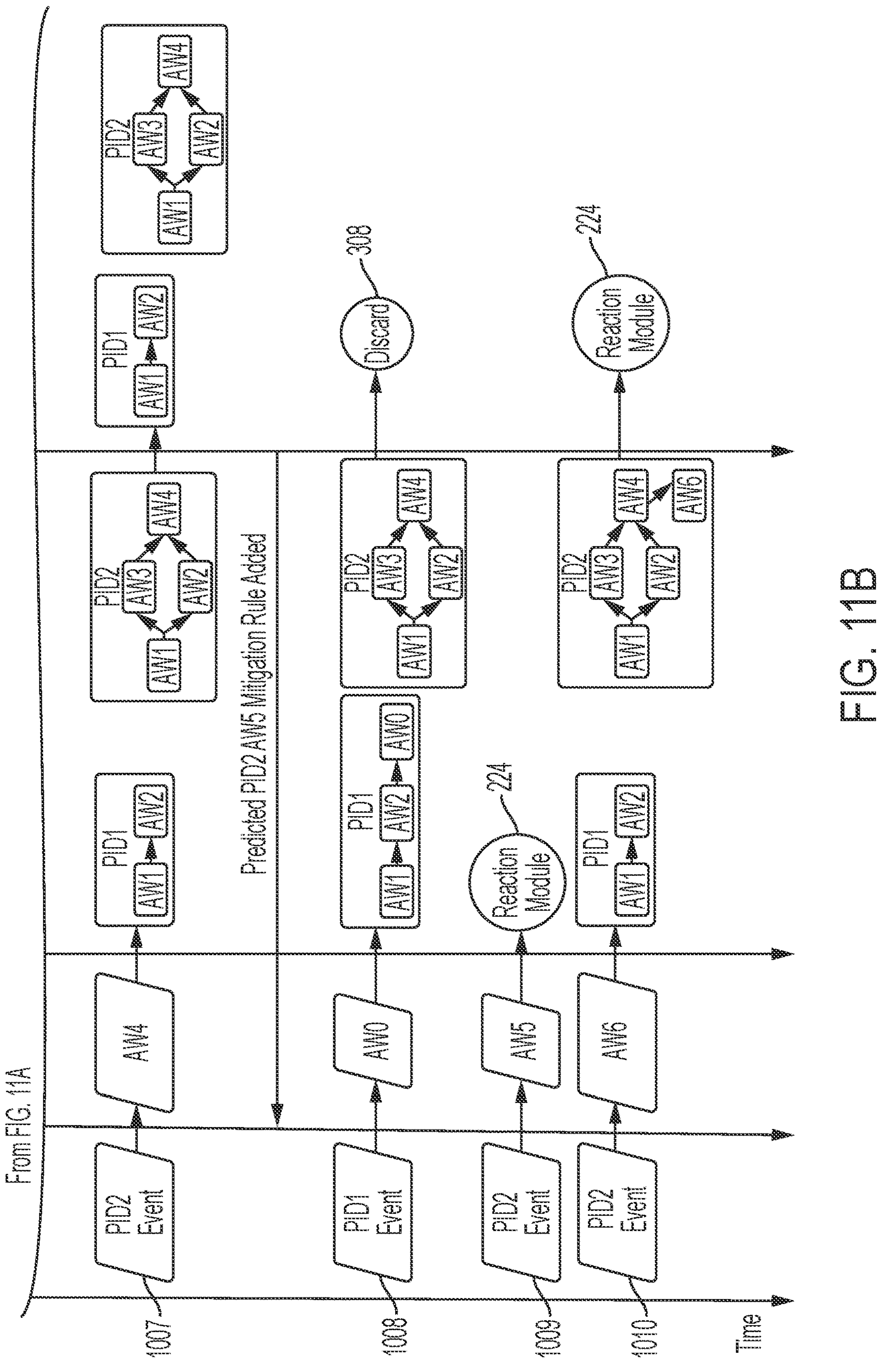

FIG. 11 illustrates steps and resulting states of evaluating an event stream representing two distinct entities through the behavioral anti-malware engine. This illustration presents a different view of the architecture presented in FIG. 3. and the process presented in FIG. 4. The events are classified at attack words (AW) and committed to an attack word graph (AW graph) for a process identifier (PID).

First event 1001 illustrates an event that is classified as AW1 and is committed to the AW graph for entity PID1. Second event 1002 illustrates an event that is not classified as an attack word nor represents a causal relationship and the event is discarded. Third event 1003 illustrates an event that represents a causal relationship between entities PID1 and PID2. As a result the attack graph from entity PID1 is cloned to entity PID2. Fourth event 1004 illustrates an event that is classified as AW2 and is committed to the AW graph for entity PID1 extending PID1's graph to two nodes 'AW1->AW2', entity PID2 is not extended in this scenario because fourth event 1004 happened after causal relationship third event 1003 in time order. Fifth event 1005 Illustrates an event that is classified as AW2 for entity PID2 extending PID2's graph to two nodes 'AW1->AW3'; entity PID1 is not extended in this scenario because it is not an actor in fifth event 1005. Sixth event 1006 illustrates an event that represents a causal relationship between entities PID1 and PID2 again. As a result the attack graph from entity PID1 is merged with the graphs on entity PID2. The resulting graph for PID2 now contains nodes 'AW1, AW2, AW3'. Two possible attack sentences can be constructed from the graph on PID2 now, 'AW1->AW3' and 'AW1->AW2'. Seventh event 1007 illustrates an event that is classified as AW4 on entity PID2. This extends the graph for PID2 and it now contains the nodes 'AW1, AW2, AW3 and AW4'. Two possible attack sentences can be constructed from the graph on PID2 now, 'AW1->AW2->AW4' and 'AW1->AW3->AW4'. In this illustration the behavioral graph engine predicts that a possible next attack word for PID2 would be 'AW5' and a rule is added to the event classification engine to react if AW5 is subsequently detected from PID2. Eighth event 1008 illustrates an event that is classified as AW0 on entity PID2. This event is added to the provisional graph, but the behavioral graph engine determines that it does not represent a coherent attack sentence or sentence fragment and the event and provisional graph are both dropped. The graph state of entities PID1 and PID2 remains unchanged from before eighth event 1008. Ninth event 1009 illustrates an event that is classified as AW5 on entity PID2. Due to the rule that was added as a result of seventh event 1007 the reaction module handles this event and the event is mitigated as a blocked attack. Tenth event 1010 illustrates an event that is classified as AW6 on entity PID2. The tenth event is added to the graph for PID2 and now contains 'AW1, AW2, AW3, AW4, and AW6'. The behavioral graph engine determines that one or more of the attack sentences 'AW1-AW2-AW4-AW6' or 'AW1-AW3-AW4-AW6' represents a complete attack sentence and the reaction module mitigates the event as a blocked attack.

Figure 12:
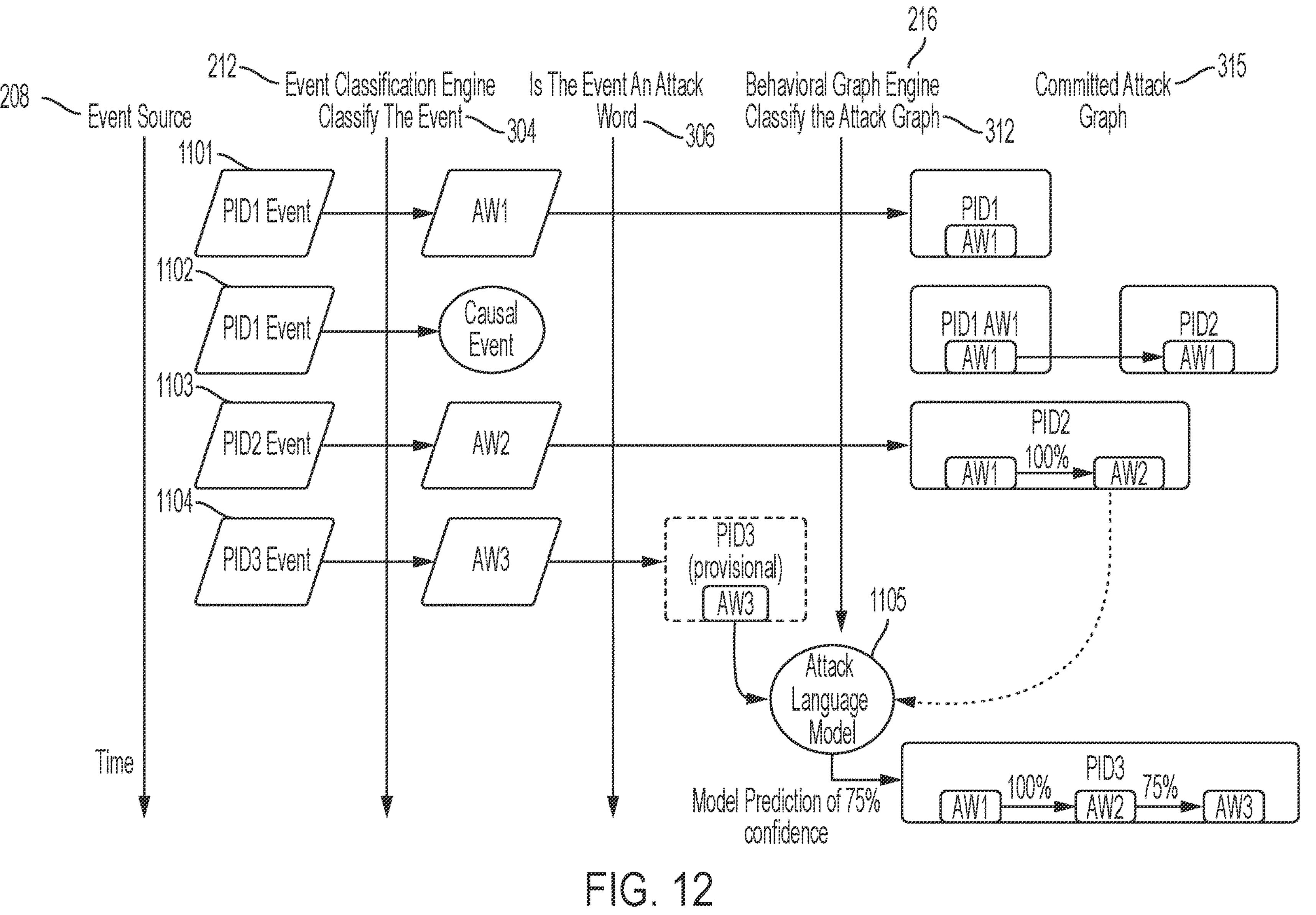
FIG. 12 illustrates how a behavioral anti-malware engine works with a stream of events from multiple actors and an attack sentence model to create graph links across causal gaps.

FIG. 12 illustrates steps and resulting states of evaluating an event stream representing three distinct entities through the behavioral anti-malware engine, with particular focus on the use of an attack language model to predict if an attack sentence fragment represents a continuation of a previous attack sentence fragment. Event source 208 is interacts with the event classification engine 212 and the event is classified 304. It is determined if the event is an attack word 306. The behavioral graph engine 216 classifies the attack graph 312 which is committed to attack graph 315.

Event 1101 illustrates an event that is classified as AW1 and is committed to the AW graph for entity PID1. Event 1102 illustrates an event that represents a causal relationship between entities PID1 and PID2. As a result the attack graph from entity PID1 is cloned to entity PID2. Event 1103 Illustrates an event that is classified as AW2 for entity PID2 extending PID2's graph to two nodes 'AW1->AW3'; entity PID1 is not extended in this scenario because it is not an actor in event 1103. Event 1104 illustrates an event that is classified as AW3 and is provisionally added to the AW graph for entity PID3. Either because AW3 has a low probability of beginning an attack sentence or because we know from our knowledge of the causal model of the system that PID3 represents a causal gap, we use the attack language model, which for illustration purposes predicts that the sequence AW1->AW2->AW3 has a 75% probability. As such we commit a link between AW1->AW2 and AW3 on entity PID3 and store the probability of this link within the link. We can from the entity PID3 now traverse back across the causal gap to PID2 and PID1 and establish that AW3 has provenance in PID1.

In the attack graph causal gaps would appear as one or more attack graphs that are fragments of a complete attack sentence. In this disclosure we show how the attack natural language processing (NLP) model can be used to fill in 'causal gaps' within the causal relationship model used to construct the attack graph. The attack language is semantically completed to describe one or more attack activities. When we use the causal model to store links between AW labeled events we can associate a confidence value with the link. If the causal link is due to a direct observation we can assign the confidence value at value equivalent to 100% confidence.

Often within the operating system's design attack graph 'fragments' will be associated with specific aspects of the operating system design that cause causality observability gaps and we can know with some degree of confidence that that attack graph fragment is in fact a fragment that is a continuation of another attack graph and not the beginning of a new attack graph. A specific illustration is to take the complete attack language sentence of; "'Phishing', 'Privilege Escalation', 'Persistence', 'LOL Bin', 'Download malware'" as an example. In more concrete terms using the Windows Operating System a user might open an email attachment believing that the attachment was from a co-worker (Phishing), the attachment might then make use of one of many means to bypass (User Account Control) and gain administrator privileges (Privilege Escalation), then using the Administrative privileges a scheduled task would be created (Persistence) that when ran at a later point in time would download a secondary payload from the web using a built in windows utility (LOL Bin) and execute it with system privileges (Download malware).

The Windows Operating system provides APIs that make it possible to observe the attack sentence fragments, with confidence values assigned to each link as <%>; "'Phishing' <100> 'Privilege Escalation'" and separately the continued attack sentence fragment "'Persistence' <100> 'LOL Bin' <100> 'Download malware'". Both attack language sentence fragments would have 100% confidence in the causal relationship between the words within the attack language sentence fragment. However it is infeasible to_directly_observe the causal relationship between the AW 'Privilege Escalation' and 'Persistence' due to the lack of operating system API support for observing that causal relationship. While a sufficiently determined programmer might be able to devise a scheme to directly observe this causal relationship, doing so would come at the cost of time, complexity and very likely increased support costs of the resulting solution.

Instead the systems and methods can rely upon our Attack Language model to predict that it is_probable_that the first attack sentence fragment could be completed by the second attack language fragment, yielding the complete attack language sentence graph with confidence values assigned to each link as <%>; "'Phishing' <100> 'Privilege Escalation' <75> 'Persistence' <100> 'LOL Bin' <100> 'Download malware'". Here the model (for illustration) assigns a confidence of 75% to the link between 'Privilege Escalation' and 'Persistence', whereas the other links where directly observed and as such are at 100% confidence. From our knowledge of the causality model for Windows, we can know to apply the attack language model to conduct this prediction because we can know with confidence that scheduled task processes resulting from the AW 'Persistence' start from a scheduled task service process and that there exists a causality gap between the process that schedule the task and the process that executes the task. As such we can deduce that all attack graphs that start from the scheduled task service are attack sentence fragments and can examine our existing attack graphs and record the probability in the graph that one sentence fragment is linked to the new sentence fragment. Aside from situations where we can use knowledge from an operating system specific causality model to identify causality gaps, we can also use knowledge of the word position of an AW within the attack language grammar or the attack language classification model itself to identify that a particular AW would not normally start a valid attack language sentence. If a graph starts with an AW that a sentence is not normally started with we can know to see if the graph might continue some previously established attack language sentence fragment. It should be noted that casual relationships have a time ordering dependency so we only evaluate attack language sentence graphs with attack words that happened at a time before the first events in the second attack language fragment.

The resulting link probabilities can either be dropped from the graph below some predetermined confidence interval, or can be incorporated into the model itself as a factor in making its predictions about the attack sentence. Furthermore it would be possible to make this same inductive assessment using the attack language model where the system is missing one or more AW events in the sentence. As with many spoken languages it is still possible to convey meaning if words are dropped out or garbled, since the meaning of the sentence is derived both from the literal words but also their relative position to each other. Though garbled sentences often can take on many meanings and as such the confidence in the information it conveyed drops with added distortion.

As will be appreciated by those skilled in the art, taken to an extreme, the inductive assessment using the attack language model could be used in a system where no technical capability to implement a causal model exists at all. Instead the system might receive a telemetry stream of discrete events that could be classified as attack words and then the attack language model could be applied to predict a causal relationship between the discrete attack words.

One way to curate an attack words dataset would be to develop a sufficient number of AW labeling rules, obtain a corpus of malware, build out a testing lab, detonate the malware in the lab environment with the UpSight agent running and collect the corresponding AW graphs. An alternative approach would be to utilize existing Large Language Models (LLMs), such as OpenAI's GPT (Generative Predicting Transformer) or Meta's LLaMA (Large Language Model Meta AI) which can be fine-tuned through transfer learning to be able to synthesize attack word graphs from raw body of text. The free body of text can be obtained from public domain infosec threat report articles describing various attack campaigns.

Figures 13A, 13B:
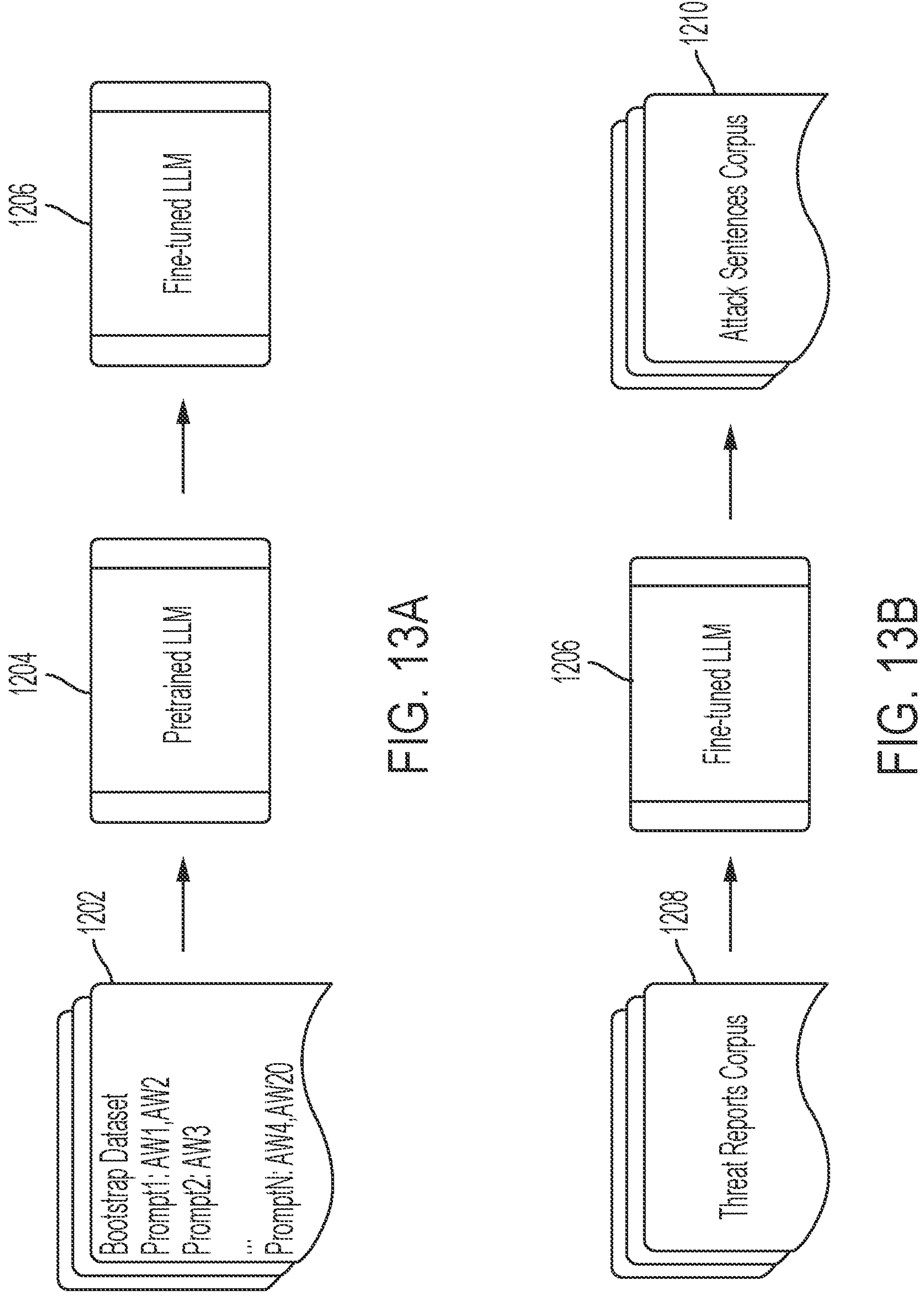
FIG. 13A illustrates how a Large Language Model (LLM) is fine-tuned on a bootstrap dataset of (prompt, attack words) pairs, in order to generate words belonging only to the attack lexicon.
FIG. 13B illustrates how the entire attack sentence corpus is obtained using the fine-tuned LLM and a corpus of natural language infosec threat reports.

As shown in FIGS. 13A-13B, the process of fine tuning an LLM 1206 through transfer learning will consist of:

Create a bootstrap dataset 1202 in the form of:

{prompt: <free form text>, result:[AW1, AW2, . . . AWn]}, where prompt—free text, describing part of an attack

[AW1, AW2, . . . AWn]—one or more attack words, annotated using the Mitre Att&ck matrix By the way of example, the bootstrap dataset may have the form:

```
{
"Prompt": "The keylogger then records keystrokes in encrypted files",
"Result": ["T1056"]
},
...
{
"Prompt": "This utility is able to execute complicated WQL queries and
WMI methods",
"Result": ["T1047']
}
```

The bootstrap dataset will be curated through manual annotation and public domain data scraped from the internet.

Select an existing pretrained LLM model 1204 that was trained on a large corpus of text scraped from the internet Perform training on this reduced bootstrap dataset, where the model is expected to output only words from the attack words lexicon as directed by the bootstrap dataset to fine-tune the LLM 1206

Once the model is fine-tuned on the bootstrap dataset, then it can start transforming infosec articles for threat report corpus 1208 into the fine-tuned LLM AW graphs 1206 that will be further used to train the attack prediction models and provide attack sentence corpus 1210.

Figure 14:
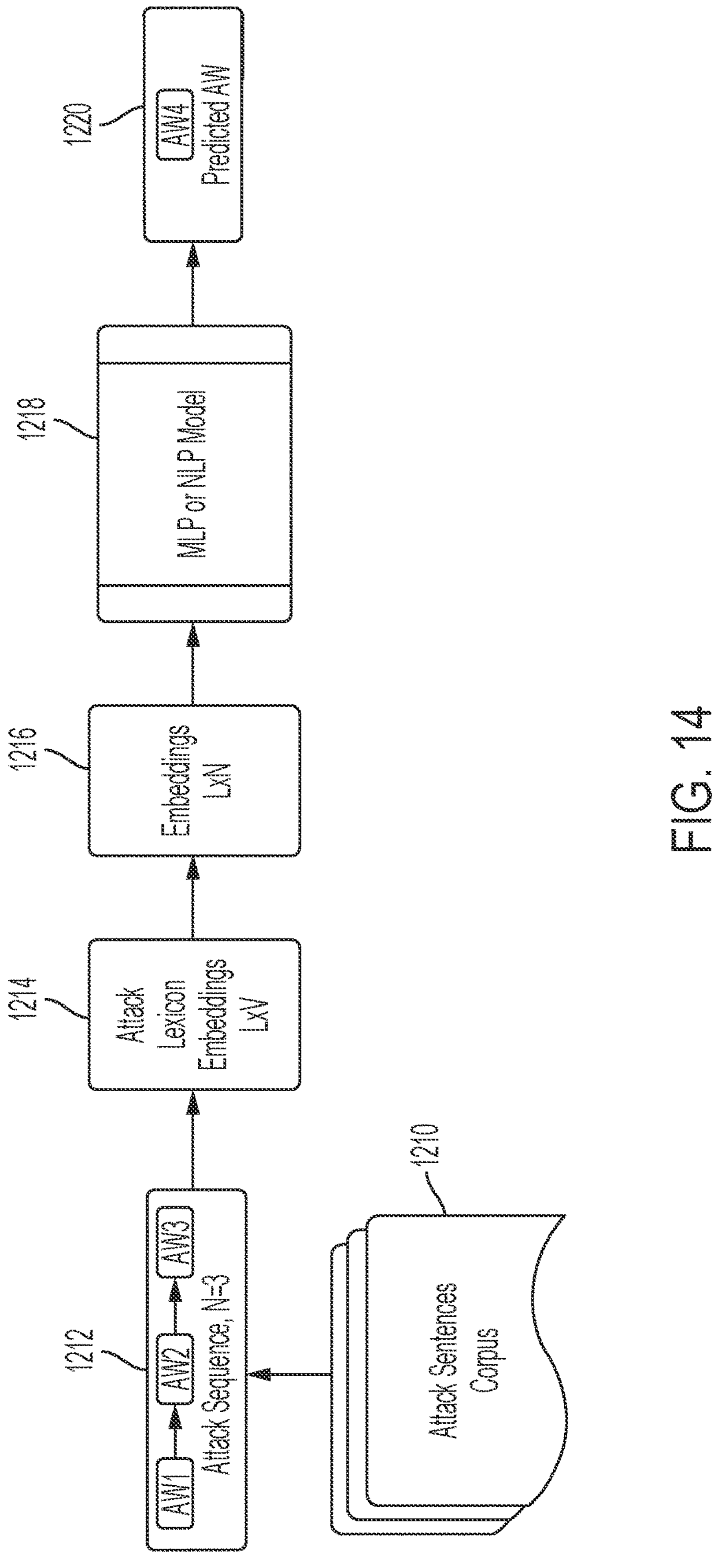
FIG. 14 illustrates how an attack word predicting model is trained, which also produces the embedding vectors.

As previously disclosed, an attack word is represented with an embedding vector of floating point values. The length L of the vector will be empirically derived after training and evaluating models having different L=8,10,16, 24 . . . etc. One way to obtain the embedding matrix is by training a Multi Level Perceptron (MLP) neural network as depicted in FIG. 14. Every attack sentence from the attach sentence corpus 1210 is broken down to attack sequences of length N. The model takes a vector of N causally ordered attack words 1212 and tries to predict the embedding of the most likely N+1 th word 1220. For example, if N=3, then:

[T1566.001 T1059.007 T1105]→T1218.011

In natural language the above translates to the following sentences:

AW1=T1566.001—"the user downloaded a zip file from a phishing campaign"

AW2=T1059.007—"a javascript file from the downloaded zip file is executed"

AW3=T1105—"the javascript downloaded an IcedID malware file"

The output of the model should be the most probable: AW4=T1218.011—"rundll32.exe tried to execute the downloaded IcedID malware from the previous step".

At the beginning of the training a lookup matrix of size L×V is initialized with random values, where L is the size of a single embedding vector and V is the size of the attack word vocabulary/lexicon. Every attack word is mapped to a column in this matrix. An attack word sequence of length N is mapped through to a matrix of size L×N 1216, where N is the length of the input sequence. During training the parameters of the embedding matrix, and the attack word predicting model 1218 are optimized based on the calculated loss function. Once the attack word predicting model 1218 is trained, the input L×V matrix represents the attack word embeddings across 1214 the entire attack lexicon.

NLP Model for Predicting the Next Attack Word

Once trained, the attack word predicting model 1218 depicted in FIG. 14 can be used to predict the next Attack Word in an attack sentence. The choice of a model will be driven by empirical results and weighting the performance of the model vs its respective compute and memory requirements. Multilayer Perceptron, long short-term memory (LSTM) networks and transformers are the logical architecture choices.

NLP Model for Recognizing an Attack Sentence

As disclosed previously, the malware engine is capable of stopping attacks based on next word prediction as well as recognizing fragments of coherent attack sentences.

One way to detect an attack in progress would be to aggregate results from the attack word predicting model 1218 over the last N predicted words and when the accumulated value reaches a certain threshold to declare the processed graph as an attack and take remediation steps.

Another approach would be to treat the attack graph classification as sentiment analysis. The model takes an attack word sequence 'AW1->AW2-> . . . ->AWn' and outputs a single confidence value, which is compared against a predefined threshold. A Long Short Term Memory (LSTM) or transformer model, would be the logical architecture choice.

FIGS. 15A-C illustrate exemplar software code used in the system.

Computer systems, computers, clients, client computers, servers, server computers and computing devices include one or more computing devices configured and/or programmed to execute the described functionality. Additionally, program code to implement the disclosed functionalities can be stored on computer-readable storage media. Any form of tangible computer readable storage medium can be used in this context, such as magnetic or optical storage media. Additionally, computer readable storage medium does not mean an electrical signal separate from an underlying physical medium. A tangible, non-transitory, computer-readable media can be provided that has instructions which, when executed by a processor, cause the processor to perform the methods described herein.

Example

The software can be installed side-by-side with a standard software such as Windows 10™ Point Protection™ software.

In a first example, a message is received from a CEO on the team's app thanking you for the hard work that you put in last quarter. The message also has a paragraph with a link purporting to relate to details about a special bonus incentive compensation plan that HR team had put together for the recipient. Many people might be lulled into a false sense of security and click on the link to learn about the bonus which results in downloading file. The file could be, for example, a file entitled: special bonus.pdf. If the downloaded PDF is opened, instead of a PDF document a credential stealer is launched which acquires logins from Google Chrome® web browser, authentication tokens from Microsft Teams®, etc.

The disclosed systems and methods address detecting computer attacks as a natural language problem. As described above, an attacker expresses an intent by taking actions which can be considered events that can be classified into an attack words. By ordering the attack words in causal graph a coherent attack sentence can be built. The coherent attack sentence is then analyzed by natural language process to predict the next word in the attack sentence or the next phase of the attack. The use of natural language analysis provides a predictive power that allows the systems and methods to detect and take preventive and intermediation actions with high confidence. Accuracy is ensured attack words have a cause and effect relationship before the attack words are applied to the model for inference.

In a concrete attack sentence words are labeled with a corresponding attack annotations. The first annotation is the mark of the web. The first annotation signifies that a file has been downloaded from the web. The second annotation identifies whether a double extension, or two or more extensions, is used. The use of a double extension points to a file which is masquerading malware to hide behind known document types. For example, a double extension for the above example could be: special bonus.pdf.exe. And third annotation is the credential theft.

The disclosed NLP model predicts that the next most likely attack stage or attack word is credential theft. When the malware attempts to steal credentials the systems and methods are operable to block the action (e.g., the attempted credential theft), and terminate a process. The causal graph enables the system to remediate everything that that the malware has done and most importantly evict the attacker. The attacker can be evicted.

When Google Chrome® downloaded the file, Chrome wrote special metadata which signified that the downloaded file came from internet. When the 7-zip process opened the archive the disclosed system tags the archive file with a mark indicating the internet as the source. Then when the 7-zip file is actually extracted the special bonus.pdf.exe the mark of the web is transferred to the special bonus.pdf.exe file and also marked with double extension. When the process started executing the process was carrying the two first attack words and the disclosed NLP model generates a prediction that the next action will be credential theft. The result is that the prediction matches reality, and the process is terminated.

The attack classification and the inference tasks can be run locally on the Window 10 Point™ operating system. No communication occurs with the back end for the purposes of attack detection. The attack classification rules, though as well as the NLP model parameters are delivered from a cloud backend powered by Microsoft Azure®.

While preferred embodiments of the present invention have been shown and described herein, it will be obvious to those skilled in the art that such embodiments are provided by way of example only. Numerous variations, changes, and substitutions will now occur to those skilled in the art without departing from the invention. For example, the use of comprise, or variants such as comprises or comprising, includes a stated integer or group of integers but not the exclusion of any other integer or group of integers. It should be understood that various alternatives to the embodiments of the invention described herein may be employed in practicing the invention. It is intended that any claims presented define the scope of the invention and that methods and structures within the scope of these claims and their equivalents be covered thereby.

What is claimed:

1. A system for classifying an event for an anti-malware behavioral graph engine comprising:

a memory;

a processor in operable communication with the memory, the processor operable to provide instructions and data and perform operations comprising:

receiving, from a threat intelligence feed, digital data associated with an event that is detected in a cybersecurity-protected computing environment;

classifying, by a classification engine, the event based on determining whether the digital data associated with the event comprises an attack word;

based on a determination that the digital data associated with the event comprises the attack word, adding, by a machine learning model, the event to an attack graph associated with an actor, wherein:

the attack word associated with the event is represented, in the attack graph, as an embedding of an attack word embedding vector having a predefined length, and the predefined length of the attack word embedding vector is derived from a multi level perceptron (MLP) neural network, wherein (i) each attack sentence from an attack sentence corpus is split into attack sentences of length N during training of the MLP neural network and (ii) the MLP neural network is configured to select a vector of the length N causally ordered attack words and predict an embedding of a most likely N+1th attack word;

determining whether the attack graph comprises a valid attack sentence;

based on a determination that the attack graph comprises the valid attack sentence, predicting, by the classification engine and based on applying the machine learning model, next possible attack words associated with the event; and based on the predicting, returning remediation instructions for automated execution in the cybersecurity-protected computing environment, wherein the remediation instructions, when executed, cause (i) automatic deletion of malicious files associated with the actor in the cybersecurity-protected computing environment and (ii) quarantining of one or more components of the cybersecurity-protected computing environment that are infected by the actor.

2. The system of claim 1 further comprising:

checking the event against a second classification engine.

3. The system of claim 2 wherein the second classification engine comprises one or more bespoke attack words.

4. The system of claim 1 further comprising:

applying a malware model to the digital data associated with the event; and recognizing non-trivial events in the event.

5. The system of claim 1 further comprising:

performing a feed check against the threat intelligence feed; and receiving the digital data associated with the event in response to performing the feed check.

6. The system of claim 5, wherein the feed check is performed real-time.

7. The system of claim 1 further comprising:

performing a flagged check against one or more user flagged attack vectors.

8. The system of claim 1 further comprising:

temporally ordering a sequence of events that are detected based on receiving the digital data associated with the event.

9. A computer-readable storage medium configured with data and programmed instructions which, upon execution by a processor, perform a method to detect malware in a computer network, the method comprising:

receiving, from a threat intelligence feed, digital data associated with an event that is detected in the computer network;

classifying the event based on determining whether the digital data associated with event comprises an attack word;

based on a determination that the digital data associated with the event comprises the attack word, adding, by a machine learning model, the event to an attack graph associated with an actor, wherein:

the attack word associated with the event is represented, in the attack graph, as an embedding of an attack word embedding vector having a predefined length, and the predefined length of the attack word embedding vector is derived from a multi level perceptron (MLP) neural network, wherein (i) each attack sentence from an attack sentence corpus is split into attack sentences of length N during training of the MLP neural network and (ii) the MLP neural network is configured to select a vector of the length N causally ordered attack words and predict an embedding of a most likely N+1th attack word;

determining whether the attack graph comprises a valid attack sentence;

based on a determination that the attack graph comprises the valid attack sentence, predicting, based on applying the machine learning model, next possible words associated with the event; and based on the predicting, returning remediation instructions for automated execution in the computer network, wherein the remediation instructions, when executed, cause (i) automatic deletion of malicious files associated with the actor in the computer network and (ii) quarantining of one or more components of the computer network that are infected by the actor.

10. The computer-readable storage medium of claim 9 further comprising:

checking the event against a second classification engine.

11. The computer-readable storage medium of claim 10 wherein the second classification engine comprises one or more bespoke attack words.

12. The computer-readable storage medium of claim 9 further comprising:

applying a malware model to the digital data associated with the event; and recognizing non-trivial events in the event.

13. The computer-readable storage medium of claim 9 further comprising:

performing a feed check against the threat intelligence feed; and receiving the digital data associated with the event in response to performing the feed check.

14. The computer-readable storage medium of claim 13 wherein the feed check is performed real-time.

15. The computer-readable storage medium of claim 9 further comprising:

performing a flagged check against one or more user flagged attack vectors.

16. The computer-readable storage medium of claim 9 further comprising:

temporally ordering a sequence of events that are detected based on receiving the digital data associated with the event.

* * * * *